United States Patent
Meardi

(10) Patent No.: US 12,272,107 B2
(45) Date of Patent: Apr. 8, 2025

(54) USE OF TIERED HIERARCHICAL CODING FOR POINT CLOUD COMPRESSION

(71) Applicant: V-NOVA INTERNATIONAL LIMITED, London (GB)

(72) Inventor: Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 281 days.

(21) Appl. No.: 17/904,093

(22) PCT Filed: Feb. 11, 2021

(86) PCT No.: PCT/GB2021/050335
§ 371 (c)(1),
(2) Date: Aug. 11, 2022

(87) PCT Pub. No.: WO2021/161028
PCT Pub. Date: Aug. 19, 2021

(65) Prior Publication Data
US 2023/0080852 A1    Mar. 16, 2023

(30) Foreign Application Priority Data

Feb. 11, 2020  (GB) ................................ 2001839

(51) Int. Cl.
*G06V 10/00*  (2022.01)
*G06T 3/40*  (2006.01)
(Continued)

(52) U.S. Cl.
CPC ............... *G06T 9/001* (2013.01); *G06T 3/40* (2013.01); *G06T 9/40* (2013.01)

(58) Field of Classification Search
CPC ...... H04N 19/33; H04N 19/34; H04N 19/597; G06T 3/40; G06T 9/40; G06T 9/001
See application file for complete search history.

(56) References Cited

U.S. PATENT DOCUMENTS 10,026,017 B2 *  7/2018  Luo ...................... G06V 20/64
10,223,810 B2 *  3/2019  Chou ................... H03M 7/3066
(Continued)

FOREIGN PATENT DOCUMENTS

CN         111133476 A    5/2020
KR   10-2020-0038534 A    4/2020
(Continued)

OTHER PUBLICATIONS

International Search Report & Written Opinion for application No. PCT/GB2021/050335 mailed on May 4, 2021.
(Continued)

*Primary Examiner* — Amir Alavi
(74) *Attorney, Agent, or Firm* — Workman Nydegger

(57) ABSTRACT

Encoding a three-dimensional point cloud. A set of points are obtained within the three-dimensional point cloud, a point within the set of points having a co-ordinate in three-dimensions. The points are converted into a two-dimensional representation. For a point within the set of points, information describing the co-ordinate is represented as a location within the two-dimensional representation and a value at the location. The two-dimensional representation is encoded using a tier-based hierarchical coding format to output encoded data. The tier-based hierarchical coding format encodes the two-dimensional representation as layers, the layers representing echelons of data used to progressively reconstruct the signal at different levels of quality.

20 Claims, 9 Drawing Sheets

(51) Int. Cl.
*G06T 9/00* (2006.01)
*G06T 9/40* (2006.01)

(56) References Cited

U.S. PATENT DOCUMENTS

| | | | |
|---|---|---|---|
| 10,511,696 B2 * | 12/2019 | Mekuria | H04L 69/04 |
| 10,748,027 B2 * | 8/2020 | Shtok | G06T 7/33 |
| 11,017,566 B1 | 5/2021 | Tourapis et al. | |
| 11,527,016 B2 * | 12/2022 | Sugio | H04N 19/33 |
| 11,627,339 B2 * | 4/2023 | Cai | H04N 19/18 375/240.18 |
| 12,079,934 B1 * | 9/2024 | Cachelin | G06T 17/205 |
| 12,087,023 B2 * | 9/2024 | Sugio | H04N 19/63 |
| 2019/0087978 A1 | 3/2019 | Tourapis et al. | |
| 2019/0087979 A1 | 3/2019 | Mammou et al. | |
| 2019/0156518 A1 | 5/2019 | Mammou et al. | |
| 2019/0156519 A1 | 5/2019 | Mammou et al. | |
| 2019/0156520 A1 | 5/2019 | Mammou et al. | |
| 2019/0311500 A1 | 10/2019 | Mammou et al. | |
| 2019/0313110 A1 | 10/2019 | Mammou et al. | |
| 2020/0007867 A1 | 1/2020 | Tourapis et al. | |
| 2020/0013215 A1 * | 1/2020 | Vosoughi | G06T 17/005 |
| 2020/0014953 A1 | 1/2020 | Mammou et al. | |
| 2020/0021847 A1 | 1/2020 | Kim et al. | |
| 2020/0193645 A1 | 6/2020 | Mammou et al. | |
| 2020/0228836 A1 | 7/2020 | Schwarz et al. | |
| 2020/0273208 A1 | 8/2020 | Mammou et al. | |
| 2020/0320744 A1 | 10/2020 | Nakagami et al. | |
| 2021/0012536 A1 | 1/2021 | Mammou et al. | |
| 2021/0097725 A1 | 4/2021 | Mammou et al. | |
| 2021/0150765 A1 | 5/2021 | Mammou et al. | |
| 2021/0150766 A1 | 5/2021 | Mammou et al. | |
| 2021/0185331 A1 | 6/2021 | Mammou et al. | |
| 2021/0256735 A1 | 8/2021 | Tourapis et al. | |
| 2021/0266597 A1 | 8/2021 | Kim et al. | |
| 2022/0005228 A1 | 1/2022 | Tourapis et al. | |
| 2022/0070493 A1 | 3/2022 | Mammou et al. | |
| 2023/0080852 A1 * | 3/2023 | Meardi | H04N 19/597 382/232 |
| 2023/0125227 A1 | 4/2023 | Mammou et al. | |
| 2023/0215055 A1 * | 7/2023 | Dai | G06T 9/005 382/232 |
| 2023/0232044 A1 | 7/2023 | Kim et al. | |

FOREIGN PATENT DOCUMENTS

| | | |
|---|---|---|
| KR | 10-2021-0154893 A | 12/2021 |
| WO | 2019/034807 | 2/2019 |
| WO | 2019/055963 A1 | 3/2019 |
| WO | 2019/078000 A1 | 4/2019 |
| WO | 2019/142163 | 7/2019 |

OTHER PUBLICATIONS

Gwangju, KR, "Requirements for Point Cloud Compression", Jan. 2018.
Office Action received for Japanese Patent Application No. 2022-548598, mailed on Jan. 7, 2025, 17 pages (7 pages of English Translation and 10 pages of Original Document).

* cited by examiner

USE OF TIERED HIERARCHICAL CODING FOR POINT CLOUD COMPRESSION

TECHNICAL FIELD

The present invention relates to methods for processing point cloud signals, such as, by way of non-limiting examples, a point cloud representation for 6 degrees-of-freedom (DoF) volumetric video. Processing data may include, but is not limited to, obtaining, deriving, encoding, outputting, receiving and reconstructing a signal in the context of a hierarchical (tier-based) coding format, where the signal is decoded in tiers at subsequently higher level of quality, leveraging and combining subsequent tiers ("echelons") of reconstruction data. Different tiers of the signal may be coded with different coding formats, by means of different elementary streams that may or may not be multiplexed in a single bitstream.

BACKGROUND

In recent years, an increasing number of applications have been leveraging point cloud signals to represent volumetric "immersive" reality, which can then be rendered in real time so as to allow viewers to change their viewpoint dynamically during playback. This is particularly impactful in a virtual or augmented (VR/AR) context, but also finds applications with two-dimensional (2D) displays, for instance allowing the display device to track the head of the viewer so as to change the viewpoint shown by the screen based on the head movements of the viewer.

Certain applications require the efficient encoding, transmission, storage and decoding of point cloud information. This information typically comprises a set of points in a multidimensional space (e.g., three-dimensional—3D—space, 3D space over time, etc.). As such, immersive point cloud signals allow unique user experiences such as immersive 6 DoF stereoscopic video, but also require extremely high amount of data. Each point in the cloud may have several different properties, such as its (x, y, z) position, the reference point from which coordinates are computed, multiple normal vectors with respect to the surface that best interpolates the surface of the object in that position (for any given point of view, if the point represents a volume of perceivable size), multiple colours (e.g., including the colours seen from different angles, such as right eye vs. left eye), motion information of the point, motion information of the reference system, other attributes of the signal in that particular location, etc. Some of these attributes may require bit-depths higher than 8 or even 10 bits, typically used to represent pixel values of conventional images or video. This information is typically difficult to transmit and store efficiently, and poses multiple challenges in terms of compression, including but not limited to processing power requirements. For example, data structures may be required that represent the whole possible three-dimensional space, despite sparse point clouds only taking up a fraction of this space. In addition, the specific format of point cloud signals may vary from use case to use case, making it impractical to define a hardware-based compression scheme that is 100% dedicated to each type of point cloud signal.

State-of-the art methods to compress point cloud data, also recently subject of standardization efforts within MPEG, are based on two distinct methods: either trying to represent volumetric data (e.g., with oct-trees structures) or trying to repurpose existing discrete cosine transform (DCT)-based video codecs so as to encode portions of the point cloud that are transformed into two-dimensional (or so-called "2.5D", in reference to the addition of depth information) surfaces. In so doing, these methods can be reused for 6 DoF data hardware that is already available to encode and decode 2D video. However, these approaches present limitations in terms of the resolutions that can be encoded, the bit-depth precision that can be used and the overall amount of data that can be encoded, precisely due to the constraint of reusing hardware that was developed for a very different purpose.

SUMMARY OF INVENTION

According to a first aspect, there is provided a method of encoding a three-dimensional point cloud as recited in independent claim 1.

According to a second aspect there is provided a method of decoding a three-dimensional point cloud as recited in independent claim 15.

Preferred embodiments are recited in the dependent claims. Other non-claimed aspects are also described below.

DETAILED DESCRIPTION

Figure 1:
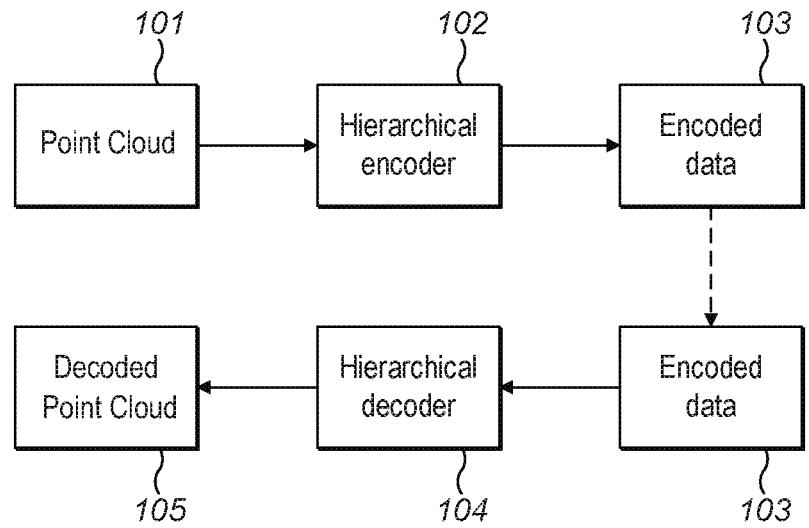
FIG. 1 shows a high-level schematic of an example point cloud encoding and decoding pipeline.

Embodiments described herein allow to effectively leverage and adapt tier-based hierarchical coding methods so as to efficiently compress 6 DoF point cloud data.

Some of the benefits of tier-based hierarchical coding include coding efficiency, amenability to fast software processing via massively parallel processing (e.g., graphical processing units—GPUs), the possibility to encode and decode signals at very high resolution and bit-depth (i.e., without "hardwiring" any constraint in the silicon), progressive decoding (i.e., possibility to stop the decoding process at a resolution lower than the maximum) and region-ofinterest decoding (i.e., possibility to fully decode an area of the signal without necessarily completing the decoding process for the entire signal).

In tier-based coding formats, a signal is decomposed in multiple "echelons" (also known as "hierarchical tiers" or "layers") of data, each corresponding to a "Level of Quality" ("LoQ") of the signal, from the highest echelon at the sampling rate of the original signal to a lowest echelon, which typically has a lower sampling rate than the original signal. In the non-limiting example when the signal is a picture, the lowest echelon may be a thumbnail of the original picture, or even just a single picture element. Other echelons contain information on correction to apply to a reconstructed rendition in order to produce the final output. The decoded signal at a given Level of Quality is reconstructed by first decoding the lowest echelon (thus reconstructing the signal at the first—lowest—Level of Quality), then predicting a rendition of the signal at the second—next higher—Level of Quality, then decoding the corresponding second echelon of reconstruction data (also known as "residual data" at the second Level of Quality), then combining the prediction with the reconstruction data so as to reconstruct the rendition of the signal at the second—higher—Level of Quality, and so on, up to reconstructing the given Level of Quality.

Different echelons of data may be coded using different coding formats, and different Levels of Quality may have different sampling rates (e.g., resolutions, for the case of image or video signals). Subsequent echelons may refer to a same signal resolution (i.e., sampling rate) of the signal, or to a progressively higher signal resolution. The description accompanying FIGS. 2 to 7 describe example tier-based coding formats in further detail.

Non-limiting embodiments of the invention utilise such advantages of tier-based coding formats by referring to a signal as a sequence of time samples (i.e., for the case of 6 DoF point clouds, the state of the volume at a particular moment in time, loosely corresponding to a frame in a volumetric video sequence). In the description the terms "point cloud", "volumetric image", "volumetric picture", "volume" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X, Y, Z and viewpoint), and comprises a set of plane elements (or "element", or "pel", or display element for three-dimensional images often called "voxel", etc.) characterized by one or more "values" or "settings" (e.g., by ways of non-limiting examples, colour settings in a suitable colour space, settings indicating alpha channel transparency level, settings indicating the normal vector of a surface, settings indicating motion, setting indicating density levels, settings indicating temperature levels, etc.). Each plane element is identified by a suitable set of coordinates, indicating the integer positions of said element in the sampling grid of a volumetric image. Signal dimensions can include only spatial dimensions (e.g., in the case of a 6 DoF image) or also a time dimension (e.g., in the case of a signal evolving over time, such as a 6 DoF immersive video signal).

As non-limiting examples, a signal can be a 3 DoF/6 DoF video signal, a plenoptic signal, an event-driven-camera signal, a volumetric signal of other type (e.g., medical imaging, scientific imaging, holographic imaging, etc.), or even signals with more dimensions.

For simplicity, non-limiting embodiments illustrated herein often refer to signals that are rendered from a viewpoint as monoscopic or stereoscopic 2D planes of settings (e.g., 2D images in a suitable colour space), such as for instance a 6 DoF VR video signal or a 6 DoF video signal. The terms "frame" will be used interchangeably with the term "image", so as to indicate a sample in time of the 6 DoF point cloud signal: any concepts and methods illustrated for 6 DoF video signals can be easily applicable also to point cloud signals of other types, and vice versa. Despite the focus of embodiments illustrated herein on 6 DoF point cloud video signals, people skilled in the art can easily understand that the same concepts and methods are also applicable to any other types of multidimensional signal (e.g., plenoptic signals, LIDAR, event-driven cameras, holograms, etc.).

At a high level, point cloud data is processed (e.g., converted) so that it is represented as a number of lower (e.g., two) dimensional representations. The point cloud data can thus be represented as a position having a corresponding value (i.e., at the position) in the lower dimensional representation(s). The lower dimensional representation(s) are then encoded using a tier based hierarchical coding format. To decode, the point cloud data can be reconstructed from the lower dimensional representations. In these examples, lower dimensional representations may comprise a lower number of dimensions in space (e.g., representing a 3D point cloud as a series of 2D frames).

In more detail, in embodiments, an encoding method comprises obtaining points (e.g., elements referenced with respect to a given point of reference) within the multidimensional (e.g., three-dimensional) point cloud. The points are converted into a lower dimensional representation (e.g., a two-dimensional representation). Further information related to the point is represented as a location within the lower dimensional representation and a corresponding value at the location. For example, this may be a pixel location within a 2D frame where that pixel also has metadata that is encoded as the value. The lower dimensional representation is encoded using a tier-based hierarchical coding format to generate encoded data. In this way, the lower dimensional representation is encoded as a plurality of layers. The plurality of layers represent echelons of data can be used to progressively reconstruct the signal at different levels of quality. In this manner, the 3D point cloud is effectively encoded using lower resolution representations (in examples, lower spatial resolution 2D "views").

To decode such data, the encoded data is processed to determine, from the lower dimensional representation, the three-dimensional co-ordinates for the points within the three-dimensional point cloud. The processing may further determine other associated attributes for the set of points within the three-dimensional point cloud.

In embodiments, tiered hierarchical coding is performed on the lower dimensional representations. Examples of suitable tiered hierarchical coding are now described in further detail.

Certain examples described herein relate to methods for encoding and decoding signals. Processing data may include, but is not limited to, obtaining, deriving, outputting, receiving and reconstructing data.

Certain tier-based hierarchical formats described herein use a varying amount of correction (e.g., in the form of also "residual data", or simply "residuals") in order to generate a reconstruction of the signal at the given level of quality that best resembles (or even losslessly reconstructs) the original. The amount of correction may be based on a fidelity of a predicted rendition of a given level of quality. Residuals are computed between representations at different layers of quality, as such they may be considered a form of interlayer residual that is computed with respect to common groups of pixels at different levels of quality.

In preferred examples, the encoders or decoders are part of a tier-based hierarchical coding scheme or format. Examples of a tier-based hierarchical coding scheme include LCEVC: MPEG-5 Part 2 LCEVC ("Low Complexity Enhancement Video Coding") and VC-6: SMPTE VC-6 ST-2117, the former being described in PCT/GB2020/050695 (and the associated standard document) and the latter being described in PCT/GB2018/053552 (and the associated standard document), all of which are incorporated by reference herein. However, the concepts illustrated herein need not be limited to these specific hierarchical coding schemes.

FIG. 1 illustrates a hierarchical coding scheme for point cloud data. In particular, FIG. 1 shows an example encoding and decoding pipeline. Data defining a point cloud 101 is received by a hierarchical encoder 102. The hierarchical encoder 102 processes the point cloud data such that it may be encoded by an adapted version of the hierarchical encoders described below with references to FIGS. 2 to 7. In one case, the data may comprise generating views of the point cloud 801 (e.g., rendering 2D views of the 3D points); in other cases, it may comprise generating data structures representing the points (e.g. indexed lists of co-ordinates and properties for a set of points). Reference to points set out herein also applies to surface element models. The hierarchical encoder 102 takes processed data defining the point cloud and generates a set of encoded data 103.

Figure 6:
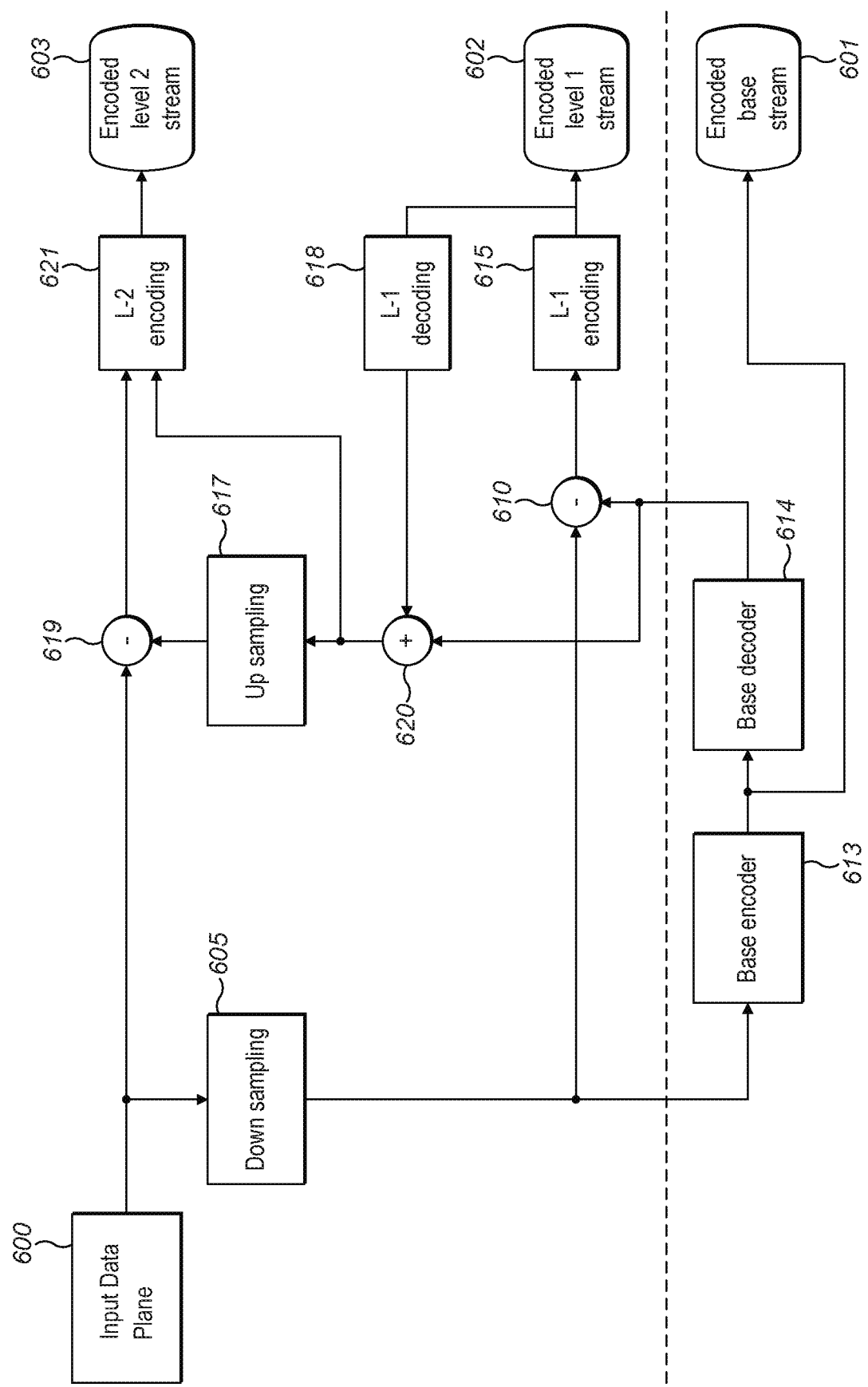
FIG. 6 shows a high-level schematic of an encoding process of a hierarchical coding technology.
Figure 7:
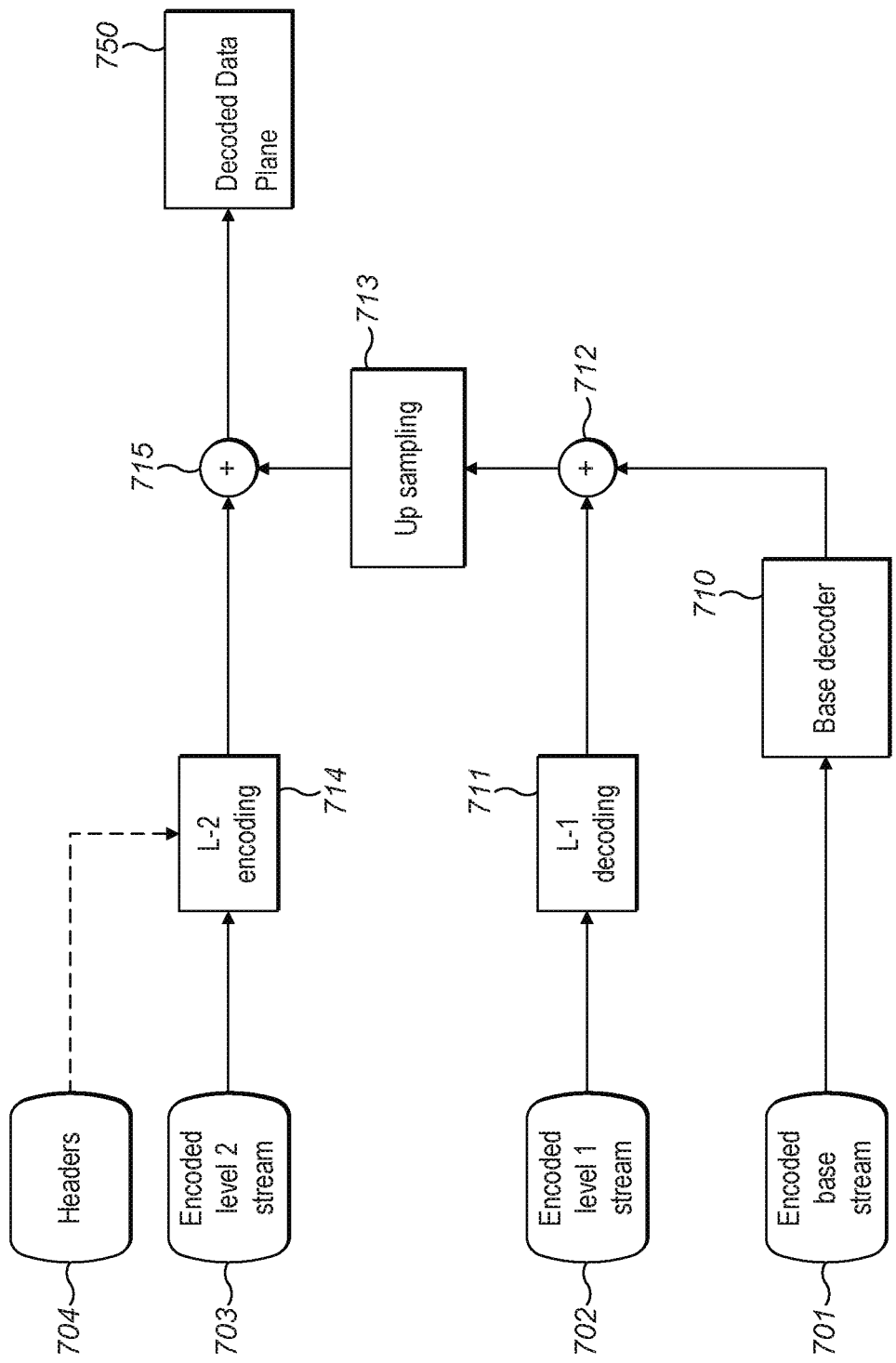
FIG. 7 shows a high-level schematic of a decoding process suitable for decoding the output of FIG. 6.

In one case, the hierarchical encoder 102 and decoder 104 may be based on the SMPTE VC-6 standard format (ST-2117—hereafter "VC-6"). Below, FIGS. 2 to 5 provide examples similar to the implementation of SMPTE VC-6 ST-2117. The SMPTE VC-6 standard format (ST-2117) is described in PCT/GB2018/053552, which is incorporated herein by reference. In other examples, the hierarchical encoder 102 and decoder 104 may be based on the LCEVC MPEG-5 Part 2 standard—hereafter "LCEVC"). FIGS. 6 and 7 provide examples similar to the implementation of MPEG-5 Part 2 LCEVC. It may be seen that both sets of examples utilise common underlying operations (e.g., downsampling, upsampling and residual generation) and may share modular implementing technologies.

The hierarchical encoder 102 may obtain or generate one or more views of the point cloud 101 and encode these views as custom data planes for one or more frames. The custom data planes may take the place of the three colour planes used in comparative video encoding (e.g., take the place of YUV or RGB planes). The custom data planes may enable depth information and other property values to be encoded. For example, a view of the point cloud may be generated as a projected two-dimensional representation of the three-dimensional points, where the two dimensions of the two-dimensional representation that define a location and the value at that location allow the three-dimensional co-ordinate of the point to be reconstructed. For example, in one case, the two-dimensional representation may comprise a depth map for a particular view, where the value represents the depth of a point in the view. In other cases, multiple two-dimensional views from different locations and with different viewing directions may be generated, e.g. as multiple "planes" similar to multiple colour planes. Using these multiple views, the original three-dimensional coordinate may be reconstructed.

In certain cases, categorical properties may be encoded as numeric values in these custom data planes, and aspects like normal vectors, colour information, transparency information, motion vectors, etc. may be encoded using multiple data planes (e.g., one plane for each element of the normal vector). The plurality of data frames may be associated with one frame (F) of video which may then be encoded by the hierarchical encoder 102 as per colour planes of a conventional frame of video. Technologies such as the tier-based encoding formats described herein are easily expandable to encode frames of video with more than three component planes. This is because colour planes are typically encoded in parallel and so custom data "planes" can be added and also encoded in parallel using the same approaches. If the point cloud 101 is sparse then only a single view may be required. If points overlap in the two-dimensional view, then multiple views may be generated and the closest point to a particular view may be encoded as the view value. By combining data from multiple views, which may be represented as multiple custom data planes for a single frame or for multiple frames, ambiguity (or occlusion) may be resolved and the original point cloud recovered. The details of which are described in greater depth below.

Once the hierarchical encoder 102 represents the three-dimensional point cloud as a series of custom data planes, then a "frame" of video data that is made up of these custom data planes may be encoded as per normal within a tier-based coding format such as VC-6 or LCEVC. In these tier-based coding formats, a base or core level is generated, which is a representation of the original data at a lower level of quality, as well as one or more levels of residuals which can be used to recreate the original data at a higher level of quality using a decoded version of the base level data (e.g., the residuals for a given level of quality may be added to the decoded version of the base level data). In general, the term "residuals" as used herein refers to a difference between a value of a reference array or reference frame and an actual array or frame of data. The array may be a one or two-dimensional array that represents a coding unit. For example, a coding unit may be a 2×2 or 4×4 set of residual values that correspond to similar sized areas of an input video frame.

FIGS. 2 to 5 show a hierarchical coding scheme that corresponds generally to VC-6 as mentioned above. In such encoding techniques, residuals data is used in progressively higher levels of quality. In this proposed technique, a core layer represents the encoded data planes for the point cloud at a first resolution and subsequent layers in the tiered hierarchy are residual data or adjustment layers necessary for the decoding side to reconstruct the data planes at a higher resolution. Each layer or level may be referred to as an echelon index, such that the residuals data is data required to correct low quality information present in a lower echelon index. Each layer or echelon index in this hierarchical technique, particularly each residual layer, is often a comparatively sparse data set having many zero value elements. When reference is made to an echelon index, it refers collectively to all echelons or sets of components at that level, for example, all subsets arising from a transform step performed at that level of quality.

In this particular hierarchical manner, the described data structure removes any requirement for, or dependency on, the preceding or proceeding level of quality. A level of quality may be encoded and decoded separately, and without reference to any other layer. Thus, in contrast to many known other hierarchical encoding schemes, where there is a requirement to decode the lowest level of quality in order to decode any higher levels of quality, the described methodology does not require the decoding of any other layer. Nevertheless, the principles of exchanging information described below may also be applicable to other hierarchical coding schemes.

Figure 2:
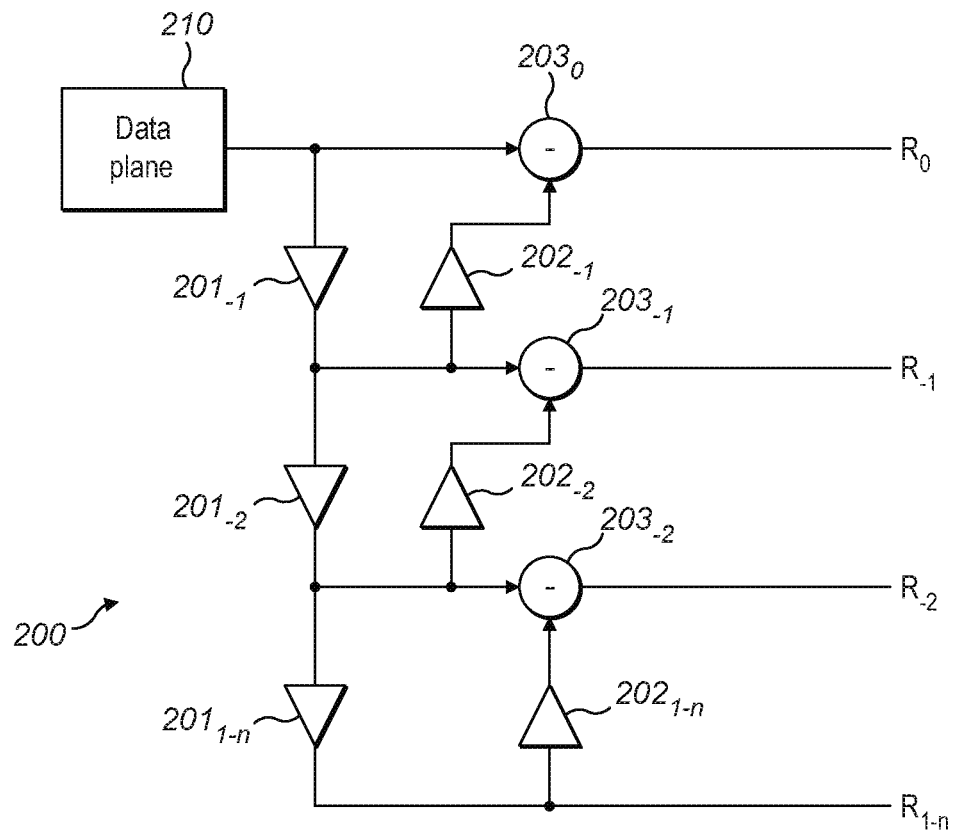
FIG. 2 shows a high-level schematic of a hierarchical deconstruction process.

As shown in FIG. 2, the encoded data represents a set of layers or levels, generally referred to here as echelon indices. FIGS. 2 to 5 are described with reference to the encoding of a data frame comprising one data "plane" 210; however, multiple data planes per frame may be encoded by repeating the described approaches in parallel for each data plane of a parent data plane. The base or core level represents the original data plane 210, albeit at the lowest level of quality or resolution and the subsequent residuals data echelons can combine with the data at the core echelon index to recreate the original image at progressively higher resolutions.

To create the core-echelon index, an input data plane 210 may be down-sampled using a number of down-sampling operations 201 corresponding to the number of levels or echelon indices to be used in the hierarchical coding operation. One fewer down-sampling operation 201 is required than the number of levels in the hierarchy. In all examples illustrated herein, there are 4 levels or echelon indices of output encoded data and accordingly 3 down-sampling operations, but it will of course be understood that these are merely for illustration. Where n indicates the number of levels, the number of down-samplers is n−1. The core level $R_{1-n}$ is the output of the third down-sampling operation. As indicated above, the core level $R_{1-n}$ corresponds to a representation of the input data plane at a lowest level of quality.

To distinguish between down-sampling operations 201, each will be referred to in the order in which the operation is performed on the input data 210 or by the data which its output represents. For example, the third down-sampling operation $201_{1-n}$ in the example may also be referred to as the core down-sampler as its output generates the core-echelon index or $echelon_{1-n}$, that is, the index of all echelons at this level is 1-n. Thus, in this example, the first down-sampling operation $201_{-1}$ corresponds to the $R_{-1}$ down-sampler, the second down-sampling operation $201_{-2}$ corresponds to the $R_{-2}$ down-sampler and the third down-sampling operation $201_{1-n}$ corresponds to the core or $R_{-3}$ down-sampler.

As shown in FIG. 2, the data representing the core level of quality $R_{1-n}$ undergoes an up-sampling operation $202_{1-n}$, referred to here as the core up-sampler. A difference $203_{-2}$ between the output of the second down-sampling operation $201_{-2}$ (the output of the $R_{-2}$ down-sampler, i.e. the input to the core down-sampler) and the output of the core up-sampler $202_{1-n}$ is output as the first residuals data $R_{-2}$. This first residuals data $R_{-2}$ is accordingly representative of the error between the core level $R_{-3}$ and the signal that was used to create that level. Since that signal has itself undergone two down-sampling operations in this example, the first residuals data $R_{-2}$ is an adjustment layer which can be used to recreate the original signal at a higher level of quality than the core level of quality but a lower level than the input data plane 210.

Figure 3:
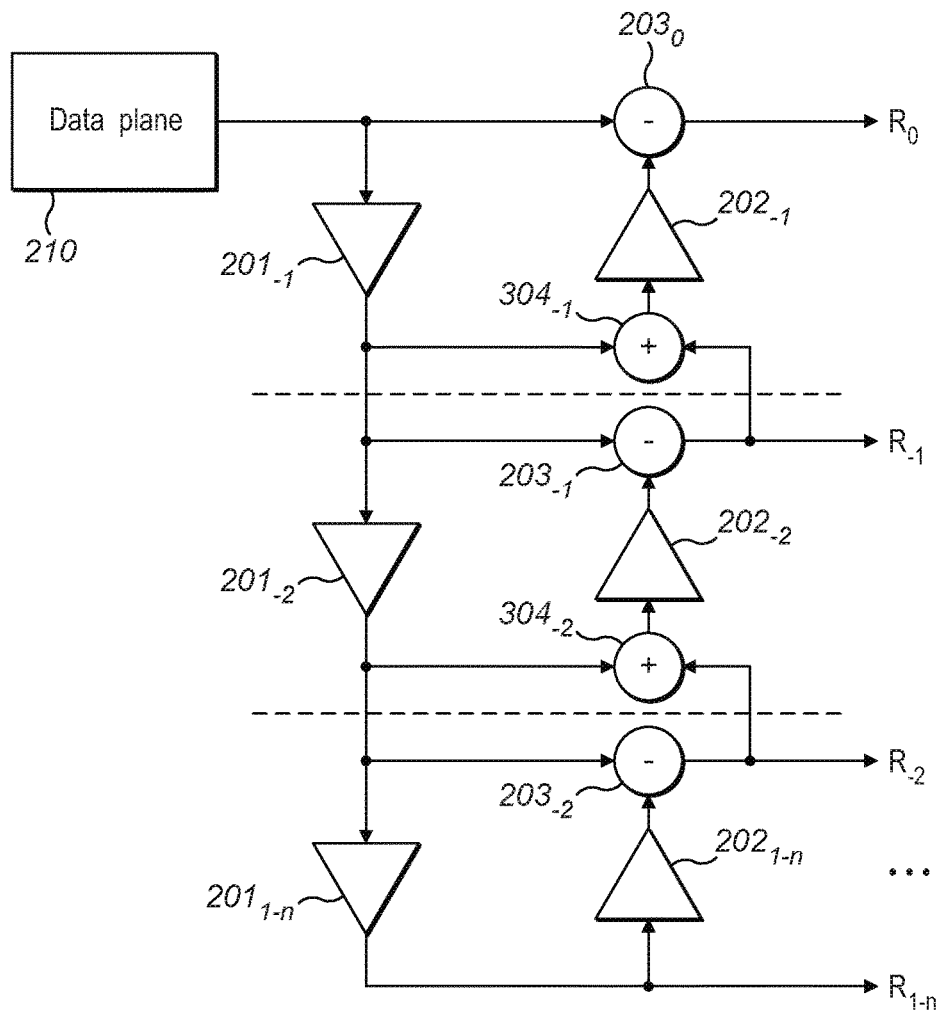
FIG. 3 shows an alternative high-level schematic of a hierarchical deconstruction process.

Variations in how to create residuals data representing higher levels of quality are conceptually illustrated in FIGS. 2 and 3.

In FIG. 2, the output of the second down-sampling operation $201_{-2}$ (or $R_{-2}$ down-sampler, i.e. the signal used to create the first residuals data $R_{-2}$), is up-sampled $202_{-2}$ and the difference $203_{-1}$ between the input to the second down-sampling operation $201_{-2}$ (or $R_{-2}$ down-sampler, i.e. the output of the $R_{-1}$ down-sampler) is calculated in much the same way as the first residuals data $R_{-2}$ is created. This difference is accordingly the second residuals data $R_{-1}$ and represents an adjustment layer which can be used to recreate the original signal at a higher level of quality using the data from the lower layers.

In the variation of FIG. 3, however, the output of the second down-sampling operation $201_{-2}$ (or $R_{-2}$ down-sampler) is combined or summed $304_{-2}$ with the first residuals data $R_{-2}$ to recreate the output of the core up-sampler $202_{1-n}$. In this variation it is this recreated data which is up-sampled $202_{-2}$ rather than the down-sampled data. The up-sampled data is similarly compared 2034 to the input to the second down-sampling operation (or $R_{-2}$ down-sampler, i.e. the output of the $R_{-1}$ down-sampler) to create the second residuals data $R_{-1}$.

The variation between the implementations of FIGS. 2 and 3 results in slight variations in the residuals data between the two implementations. FIG. 2 benefits from greater potential for parallelisation.

The process or cycle repeats to create the third residuals $R_0$. In the examples of FIGS. 2 and 3, the output residuals data $R_0$ (i.e. the third residuals data) corresponds to the highest level and is used at the decoder to recreate the input data plane. At this level the difference operation is based on the input data plane which is the same as the input to the first down-sampling operation.

Figure 4:
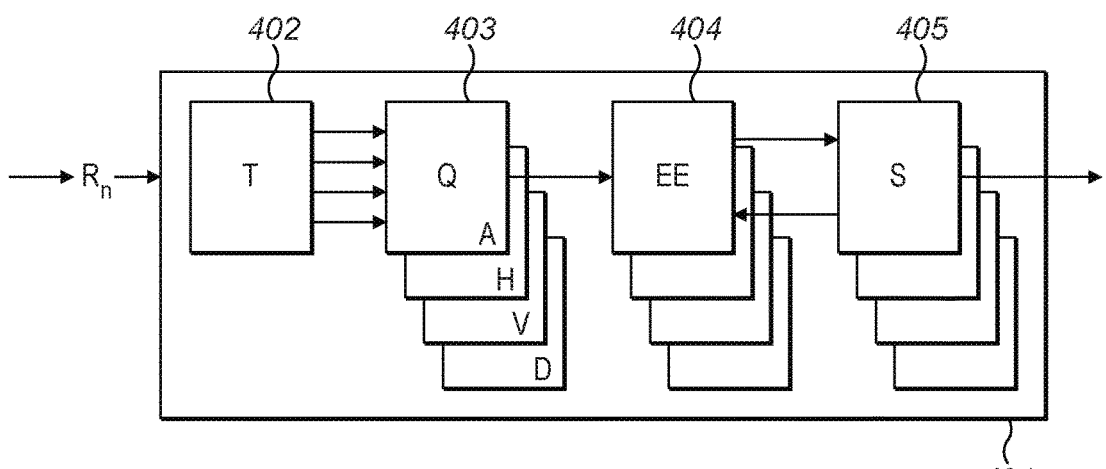
FIG. 4 shows a high-level schematic of an encoding process suitable for encoding the residuals of tiered outputs.

FIG. 4 illustrates an example encoding process 401 for encoding each of the levels or echelon indices of data to produce a set of encoded echelons of data having an echelon index. This encoding process is used merely for example of a suitable encoding process for encoding each of the levels, but it will be understood that any suitable encoding process may be used. The input to the process is a respective level of residuals data output from FIG. 2 or 3 and the output is a set of echelons of encoded residuals data, the echelons of encoded residuals data together hierarchically represent the encoded data.

In a first step, a transform 402 is performed. The transform may be directional decomposition transform as described in WO2013/171173 or a wavelet or discrete cosine transform. If a directional decomposition transform is used, there may be output a set of four components (also referred to as transformed coefficients). When reference is made to an echelon index, it refers collectively to all directions (A, H, V, D), i.e., 4 echelons. The component set is then quantized 403 before entropy encoding. In this example, the entropy encoding operation 404 is coupled to a sparsification step 405 which takes advantage of the sparseness of the residuals data to reduce the overall data size and involves mapping data elements to an ordered quadtree. Such coupling of entropy coding and sparsification is described further in WO2019/111004 but the precise details of such a process is not relevant to the understanding of the invention. Each array of residuals may be thought of as an echelon.

The process set out above corresponds to an encoding process suitable for encoding data for reconstruction according to SMPTE ST 2117, VC-6 Multiplanar Picture Format. VC-6 is a flexible, multi-resolution, intra-only bitstream format, capable of compressing any ordered set of integer element grids, each of independent size but is also designed for picture compression. It employs data agnostic techniques for compression and is capable of compressing low or high bit-depth pictures. The bitstream's headers can contain a variety of metadata about the picture.

As will be understood, each echelon or echelon index may be implemented using a separate encoder or encoding operation. Similarly, an encoding module may be divided into the steps of down-sampling and comparing, to produce the residuals data, and subsequently encoding the residuals or alternatively each of the steps of the echelon may be implemented in a combined encoding module. Thus, the process may be for example be implemented using 4 encoders, one for each echelon index, 1 encoder and a plurality of encoding modules operating in parallel or series, or one encoder operating on different data sets repeatedly.

The following sets out an example of reconstructing an original data plane, the data plane having been encoded using the above exemplary process. This reconstruction process may be referred to as pyramidal reconstruction. Advantageously, the method provides an efficient technique for reconstructing a data plane encoded in a received set of data, which may be received by way of a data stream, for example, by way of individually decoding different component sets corresponding to different image size or resolution levels, and combining the detail from one decoded component set with the upscaled decoded data from a lower-resolution component set. Thus, by performing this process for two or more component sets, structure or detail within data planes may be reconstructed for progressively higher resolutions or greater numbers of pixels, without requiring the full or complete detail of the highest-resolution component set to be received. Rather, the method facilitates the progressive addition of increasingly higher-resolution details while reconstructing a data plane from a lower-resolution component set, in a staged manner.

Moreover, the decoding of each component set separately facilitates the parallel processing of received component sets, thus improving reconstruction speed and efficiency in implementations wherein a plurality of processes is available.

Each resolution level corresponds to a level of quality or echelon index. This is a collective term, associated with a plane (in this example a representation of a grid of integer value elements) that describes all new inputs or received component sets, and the output reconstructed image for a cycle of index-m. The reconstructed image in echelon index zero, for instance, is the output of the final cycle of pyramidal reconstruction.

Pyramidal reconstruction may be a process of reconstructing an inverted pyramid starting from the initial echelon index and using cycles by new residuals to derive higher echelon indices up to the maximum quality, quality zero, at echelon index zero. A cycle may be thought of as a step in such pyramidal reconstruction, the step being identified by an index-m. The step typically comprises up-sampling data output from a possible previous step, for instance, upscaling the decoded first component set, and takes new residual data as further inputs in order to obtain output data to be up-sampled in a possible following step. Where only first and second component sets are received, the number of echelon indices will be two, and no possible following step is present. However, in examples where the number of component sets, or echelon indices, is three or greater, then the output data may be progressively upsampled in the following steps.

The first component set typically corresponds to the initial echelon index, which may be denoted by echelon index 1-N, where N is the number of echelon indices in the plane.

Typically, the upscaling of the decoded first component set comprises applying an upsampler to the output of the decoding procedure for the initial echelon index. In examples, this involves bringing the resolution of a reconstructed picture output from the decoding of the initial echelon index component set into conformity with the resolution of the second component set, corresponding to 2-N. Typically, the upscaled output from the lower echelon index component set corresponds to a predicted plane at the higher echelon index resolution. Owing to the lower-resolution initial echelon index plane and the up-sampling process, the predicted plane typically corresponds to a smoothed or blurred version of the data.

Adding to this predicted plane higher-resolution details from the echelon index above provides a combined, reconstructed plane set. Advantageously, where the received component sets for one or more higher-echelon index component sets comprise residual data, or data indicating the pixel value differences between upscaled predicted data planes and original, uncompressed, or pre-encoding data planes, the amount of received data required in order to reconstruct a data set of a given resolution or quality may be considerably less than the amount or rate of data that would be required in order to receive the same quality data representation using other techniques. Thus, by combining low-detail plane data received at lower resolutions with progressively greater-detail plane data received at increasingly higher resolutions in accordance with the method, data rate requirements are reduced.

Typically, the set of encoded data comprises one or more further component sets, wherein each of the one or more further component sets corresponds to a higher data plane resolution than the second component set, and wherein each of the one or more further component sets corresponds to a progressively higher data plane resolution, the method comprising, for each of the one or more further component sets, decoding the component set so as to obtain a decoded set, the method further comprising, for each of the one or more further component sets, in ascending order of corresponding data plane resolution: upscaling the reconstructed set having the highest corresponding data plane resolution so as to increase the corresponding data plane resolution of the reconstructed set to be equal to the corresponding data plane resolution of the further component set, and combining the reconstructed set and the further component set together so as to produce a further reconstructed set.

In this way, the method may involve taking the reconstructed data plane output of a given component set level or echelon index, upscaling that reconstructed set, and combining it with the decoded output of the component set or echelon index above, to produce a new, higher resolution reconstructed picture. It will be understood that this may be performed repeatedly, for progressively higher echelon indices, depending on the total number of component sets in the received set.

In typical examples, each of the component sets corresponds to a progressively higher data plane resolution, wherein each progressively data plane image resolution corresponds to a factor-of-four increase in the number of data locations (analogous to pixels) in a corresponding data plane. Typically, therefore, the data plane size corresponding to a given component set is four times the size or number of pixels, or double the height and double the width, of the data plane corresponding to the component set below, that is the component set with the echelon index one less than the echelon index in question. A received set of component sets in which the linear size of each corresponding data plane is double with respect to the data plane size below may facilitate more simple upscaling operations, for example.

In the illustrated example, the number of further component sets is two. Thus, the total number of component sets in the received set is four. This corresponds to the initial echelon index being echelon-3.

The first component set may correspond to a base data plane encoding, and the second and any further component sets correspond to residual data. As noted above, the method provides particularly advantageous data rate requirement reductions for a given data plane size in cases where the lowest echelon index, that is the first component set, contains a low resolution, or down sampled, version of the data plane being transmitted. In this way, with each cycle of reconstruction, starting with a low resolution data plane, that data plane is upscaled so as to produce a high resolution albeit smoothed version, and that data plane is then improved by way of adding the differences between that upscaled predicted data plane and the actual data plane to be transmitted at that resolution, and this additive improvement may be repeated for each cycle. Therefore, each component set above that of the initial echelon index needs only contain residual data in order to reintroduce the information that may have been lost in down sampling the original data plane to the lowest echelon index.

The method provides a way of obtaining a data plane, which be represented using residual data, upon receipt of a set containing data that has been compressed, for example, by way of decomposition, quantization, entropy-encoding, and sparsification, for instance.

The sparsification step is particularly advantageous when used in connection with sets for which the original or pre-transmission data was sparse, which may typically correspond to residual data. A residual may be a difference between elements of a first data plane and elements of a second data plane, typically co-located. Such residual data may typically have a high degree of sparseness. This may be thought of as corresponding to a view of a point cloud wherein areas of detail are sparsely distributed amongst areas in which details are minimal, negligible, or absent. Such sparse data may be described as an array of data wherein the data are organised in at least a two-dimensional structure (e.g., a grid), and wherein a large portion of the data so organised are zero (logically or numerically) or are considered to be below a certain threshold. Residual data are just one example. Additionally, metadata may be sparse and so be reduced in size to a significant degree by this process. Sending data that has been sparsified allows a significant reduction in required data rate to be achieved by way of omitting to send such sparse areas, and instead reintroducing them at appropriate locations within a received byteset at a decoder.

Typically, the entropy-decoding, de-quantizing, and directional composition transform steps are performed in accordance with parameters defined by an encoder or a node from which the received set of encoded data is sent. For each echelon index, or component set, the steps serve to decode image data so as to arrive at a set which may be combined with different echelon indices as per the technique disclosed above, while allowing the set for each level to be transmitted in a data-efficient manner.

There may also be provided a method of reconstructing a set of encoded data according to the method disclosed above, wherein the decoding of each of the first and second component sets is performed according to the method disclosed above. Thus, the advantageous decoding method of the present disclosure may be utilised for each component set or echelon index in a received set of image data and reconstructed accordingly.

Figure 5:
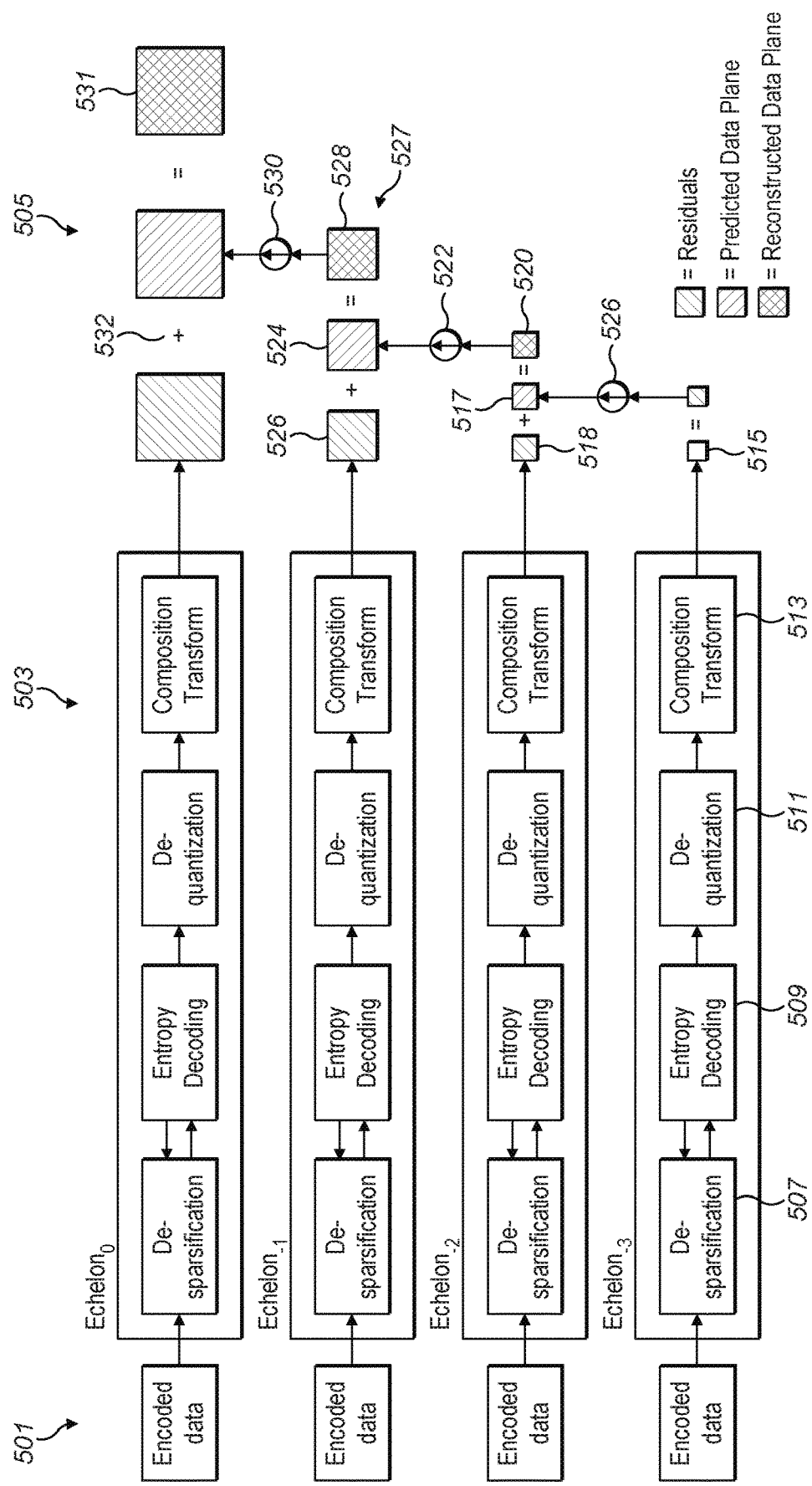
FIG. 5 shows a high-level schematic of a hierarchical decoding process suitable for decoding each output level from FIG. 4.

With reference to FIG. 5, a decoding example is now described. A set of encoded data 501 is received, wherein the set comprises four echelon indices, each echelon index comprising four echelons: from echelon$_0$, the highest resolution or level of quality, to echelon$_{-3}$, the initial echelon. The data carried in the echelon$_{-3}$ component set corresponds to a base encoding of the data plane, and the other component sets contain residual data for that transmitted data plane. While each of the levels may output data that can be considered as residuals, the residuals in the initial echelon level, that is echelon$_{-3}$, effectively correspond to an actual low resolution version of the data plane. At stage 503, each of the component sets is processed in parallel so as to decode that encoded set.

With reference to the initial echelon index, or the core-echelon index, the following decoding steps are carried out for each component set echelon$_{-3}$ to echelon$_0$.

At step 507, the component set is de-sparsified. De-sparsification may be an optional step that is not performed in other tier-based hierarchical formats. In this example, the de-sparsification causes a sparse two-dimensional array to be recreated from the encoded byteset received at each echelon. Zero values grouped at locations within the two-dimensional array which were not received (owing to there being omitted from the transmitted byteset in order to reduce the quantity of data transmitted) are repopulated by this process. Non-zero values in the array retain their correct values and positions within the recreated two-dimensional array, with the de-sparsification step repopulating the transmitted zero values at the appropriate locations or groups of locations there between.

At step 509, a range decoder, the configured parameters of which correspond to those using which the transmitted data was encoded prior to transmission, is applied to the de-sparsified set at each echelon in order to substitute the encoded symbols within the array with pixel values. The encoded symbols in the received set are substituted for pixel values in accordance with an approximation of the pixel value distribution for the data plane. The use of an approximation of the distribution, that is relative frequency of each value across all pixel values in the data plane, rather than the true distribution, permits a reduction in the amount of data required to decode the set, since the distribution information is required by the range decoder in order to carry out this step. As described in the present disclosure, the steps of de-sparsification and range decoding are interdependent, rather than sequential. This is indicated by the loop formed by the arrows in the flow diagram.

At step 511, the array of values is de-quantized. This process is again carried out in accordance with the parameters with which the decomposed data plane was quantized prior to transmission.

Following de-quantization, the set is transformed at step 513 by a composition transform which comprises applying an inverse directional decomposition operation to the de-quantized array. This causes the directional filtering, according to an operator set comprising average, horizontal, vertical, and diagonal operators, to be reversed, such that the resultant array is data for echelon$_{-3}$ and residual data for echelon$_{-2}$ to echelon$_0$.

Stage 505 illustrates the several cycles involved in the reconstruction utilising the output of the composition transform for each of the echelon component sets 501. Stage 515 indicates the reconstructed plane data output from the decoder 503 for the initial echelon. In an example, the reconstructed plane data 515 has a resolution of 64×64. At 516, this reconstructed (2D) plane data is up-sampled so as to increase its constituent number of array elements by a factor of four, thereby predicted plane data 517 having a resolution of 128×128 is produced. At stage 520, the predicted plane data 517 is added to the decoded residuals 518 from the output of the decoder at echelon$_{-2}$. The addition of these two 128×128-size arrays produces a 128×128-size reconstructed array, containing the smoothed detail from the initial echelon enhanced by the higher-resolution detail of the residuals from echelon$_{-2}$. This resultant reconstructed plane data 519 may be used to reconstruct an approximation of the point cloud, e.g. in certain cases with other planes that are also decoded in parallel. In the present example, the reconstructed plane data 519 is used for a further cycle. At step 512, the reconstructed plane data 519 is up-sampled in the same manner as at step 516, so as to produce a 25633 256-size predicted array 524. This is then combined at step 528 with the decoded echelon$_{-1}$ output 526, thereby producing a 256×256-size reconstructed array 527 which is an upscaled version of plane data 519 enhanced with the higher-resolution details of residuals 526. At 530 this process is repeated a final time, and the reconstructed plane data 527 is upscaled to a resolution of 512×512, for combination with the echelono residual at stage 532. Thereby a 512×512 reconstructed array 531 representing the original plane data (e.g. 2D view or metadata plane) is obtained.

A further hierarchical coding technology with which the principles of the present invention may be utilised is illustrated in FIGS. 6 and 7. This technology is a flexible, adaptable, highly efficient and computationally inexpensive coding format which combines a different video coding format, a base codec, (e.g., AVC, HEVC, or any other present or future codec) with at least two enhancement levels of coded data.

The general structure of the encoding scheme uses a down-sampled source signal (such as the converted point cloud data) encoded with a base codec, adds a first level of correction data to the decoded output of the base codec to generate a corrected representation, and then adds a further level of enhancement data to an up-sampled version of the corrected representation. Thus, the streams are considered to be a base stream and an enhancement stream, which may be further multiplexed or otherwise combined to generate an encoded data stream. In certain cases, the base stream and the enhancement stream may be transmitted separately. References to an encoded data as described herein may refer to the enhancement stream or a combination of the base stream and the enhancement stream. The base stream may be decoded by a hardware decoder while the enhancement stream is may be suitable for software processing implementation with suitable power consumption. This general encoding structure creates a plurality of degrees of freedom that allow great flexibility and adaptability to many situations, thus making the coding format suitable for many use cases including OTT transmission, live streaming, live ultra-high-definition UHD broadcast, and so on. As per the examples of FIGS. 2 to 5, the encoding scheme of FIGS. 6 and 7 also allows use of data plane reconstructions at particular levels of quality below a full level of quality. These data plane reconstructions may enable a low 3D resolution point cloud to be reconstructed (e.g. representing a coarser level of 3D spatial detail) if residual data for higher levels of quality is not available. This may have benefits in many applications, including robotics, that are still able to access a workable point cloud representation even if an original high-resolution point cloud cannot be reconstructed.

In certain examples, each or both enhancement streams may be encapsulated into one or more enhancement bitstreams using a set of Network Abstraction Layer Units (NALUs). The NALUs are meant to encapsulate the enhancement bitstream in order to apply the enhancement to the correct base reconstructed frame. The NALU may for example contain a reference index to the NALU containing the base decoder reconstructed frame bitstream to which the enhancement has to be applied (the frame here comprising multiple data planes that are encoded in parallel for a given time sample). In this way, the enhancement can be synchronised to the base stream and the frames of each bitstream combined to produce the decoded output video (i.e. the residuals of each frame of enhancement level are combined with the frame of the base decoded stream).

Returning to the initial process described above, where a base stream is provided along with two levels (or sub-levels) of enhancement within an enhancement stream, an example of a generalised encoding process is depicted in the block diagram of FIG. 6. An input data plane 600 at an initial resolution is processed to generate various encoded streams 601, 602, 603. The input data plane 600 may comprise a 2D view of a point cloud and/or metadata relating to points within the point cloud (e.g., see FIG. 11 later for more details). A first encoded stream (encoded base stream) is produced by feeding a base codec (e.g., AVC, HEVC, or any other codec) with a down-sampled version of the input data plane. In one case, the input data plane may form part of a multi-plane frame that is passed to the base encoder 613. The encoded base stream may be referred to as the base layer or base level. A second encoded stream (encoded level 1 stream) is produced by processing the residuals obtained by taking the difference between a reconstructed plane from the base codec and a down-sampled version of an input data plane. A third encoded stream (encoded level 2 stream) is produced by processing the residuals obtained by taking the difference between an up-sampled version of a corrected version of the reconstructed base codec data plane and the input data plane. In certain cases, the components of FIG. 6 may provide a general low complexity encoder. In certain cases, the enhancement streams may be generated by encoding processes that form part of the low complexity encoder and the low complexity encoder may be configured to control an independent base encoder and decoder (e.g., as packaged as a base codec). In other cases, the base encoder and decoder may be supplied as part of the low complexity encoder. In one case, the low complexity encoder of FIG. 6 may be seen as a form of wrapper for the base codec, where the functionality of the base codec may be hidden from an entity implementing the low complexity encoder.

A down-sampling operation illustrated by down-sampling component 605 may be applied to the input data plane to produce a down-sampled data plane to be encoded by a base encoder 613 of a base codec. The down-sampling can be done with respect to dimensions of a 2D array representing the data plane either in both vertical and horizontal directions, or alternatively only in the horizontal direction. The base encoder 613 and a base decoder 614 may be implemented by a base codec (e.g., as different functions of a common codec). The base codec, and/or one or more of the base encoder 613 and the base decoder 614 may comprise suitably configured electronic circuitry (e.g., a hardware encoder/decoder) and/or computer program code that is executed by a processor.

Each enhancement stream encoding process may not necessarily include an upsampling step. In FIG. 6 for example, the first enhancement stream is conceptually a correction stream while the second enhancement stream is upsampled to provide a level of enhancement.

Looking at the process of generating the enhancement streams in more detail, to generate the encoded Level 1 stream, the encoded base stream is decoded by the base decoder 614 (i.e. a decoding operation is applied to the encoded base stream to generate a decoded base stream). Decoding may be performed by a decoding function or mode of a base codec. The difference between the decoded base stream and the down-sampled input data plane is then created at a level 1 comparator 610 (i.e. a subtraction operation is applied to the down-sampled input data plane and the decoded base stream to generate a first set of residuals). The output of the comparator 610 may be referred to as a first set of residuals, where a residual value is determined for each array element at the resolution of the base encoder 613, the base decoder 614 and the output of the down-sampling block 605.

The difference is then encoded by a first encoder 615 (i.e. a level 1 encoder) to generate the encoded Level 1 stream 602 (i.e. an encoding operation is applied to the first set of residuals to generate a first enhancement stream).

As noted above, the enhancement stream may comprise a first level of enhancement 602 and a second level of enhancement 603. The first level of enhancement 602 may be considered to be a corrected stream, e.g. a stream that provides a level of correction to the base encoded/decoded signal at a lower (2D spatial) resolution than the input data plane 600. The second level of enhancement 603 may be considered to be a further level of enhancement that converts the corrected stream to the original input video 600, e.g. that applies a level of enhancement or correction to a signal that is reconstructed from the corrected stream.

In the example of FIG. 6, the second level of enhancement 603 is created by encoding a further set of residuals. The further set of residuals are generated by a level 2 comparator 619. The level 2 comparator 619 determines a difference between an upsampled version of a decoded level 1 stream, e.g. the output of an upsampling component 617, and the input data plane 600. The input to the up-sampling component 617 is generated by applying a first decoder (i.e. a level 1 decoder) to the output of the first encoder 615. This generates a decoded set of level 1 residuals. These are then combined with the output of the base decoder 614 at summation component 620. This effectively applies the level 1 residuals to the output of the base decoder 614. It allows for losses in the level 1 encoding and decoding process to be corrected by the level 2 residuals. The output of summation component 620 may be seen as a simulated signal that represents an output of applying level 1 processing to the encoded base stream 601 and the encoded level 1 stream 602 at a decoder.

As noted, an upsampled stream is compared to the input data plane which creates a further set of residuals (i.e. a difference operation is applied to the upsampled re-created stream to generate a further set of residuals). The further set of residuals are then encoded by a second encoder 621 (i.e. a level 2 encoder) as the encoded level 2 enhancement stream (i.e. an encoding operation is then applied to the further set of residuals to generate an encoded further enhancement stream).

Thus, as illustrated in FIG. 6 and described above, the output of the encoding process is a base stream 601 and one or more enhancement streams 602, 603 which preferably comprise a first level of enhancement and a further level of enhancement. The three streams 601, 602 and 603 may be combined, with or without additional information such as control headers, to generate a combined stream for the video encoding framework that represents the input data plane 600. Multiple planes may be encoded in this manner in parallel to make up a data frame, which represents a data sample for the point cloud at a given point in time. It should be noted that the components shown in FIG. 6 may operate on blocks or coding units of data, e.g. corresponding to 2×2 or 4×4 portions of a data plane at a particular level of resolution. The components operate without any inter-block dependencies, hence they may be applied in parallel to multiple blocks or coding units within a data plane. This differs from comparative video encoding schemes wherein there are dependencies between blocks (e.g., either spatial dependencies or temporal dependencies). The dependencies of comparative video encoding schemes limit the level of parallelism and require a much higher complexity. They also mean that the encoding approaches cannot be extended to non-video applications.

A corresponding generalised decoding process is depicted in the block diagram of FIG. 7. FIG. 7 may be said to show a low complexity decoder that corresponds to the low complexity encoder of FIG. 6. The low complexity decoder receives the three streams 601, 602, 603 generated by the low complexity encoder together with headers 704 containing further decoding information. The encoded base stream 601 is decoded by a base decoder 710 corresponding to the base codec used in the low complexity encoder. The encoded level 1 stream 602 is received by a first decoder 711 (i.e. a level 1 decoder), which decodes a first set of residuals as encoded by the first encoder 615 of FIG. 1. At a first summation component 712, the output of the base decoder 710 is combined with the decoded residuals obtained from the first decoder 711. The combined data plane representation, which may be said to be a level 1 reconstructed data plane, is upsampled by upsampling component 713. The encoded level 2 stream 103 is received by a second decoder 714 (i.e. a level 2 decoder). The second decoder 714 decodes a second set of residuals as encoded by the second encoder 621 of FIG. 1. Although the headers 704 are shown in FIG. 7 as being used by the second decoder 714, they may also be used by the first decoder 711 as well as the base decoder 710. The output of the second decoder 714 is a second set of decoded residuals. These may be at a higher resolution to the first set of residuals and the input to the upsampling component 713. At a second summation component 715, the second set of residuals from the second decoder 714 are combined with the output of the up-sampling component 713, i.e. an up-sampled reconstructed level 1 signal, to reconstruct decoded data plane 750. Multiple data planes per frame may then be decoded in parallel in a similar manner to provide multiple views that allow the point cloud data to be reconstructed.

As per the low complexity encoder, the low complexity decoder of FIG. 7 may operate in parallel on different blocks or coding units of a given data plane. Additionally, decoding by two or more of the base decoder 710, the first decoder 711 and the second decoder 714 may be performed in parallel. This is possible as there are no inter-block dependencies.

In the decoding process, the decoder may parse the headers 704 (which may contain global configuration information, or plane configuration information, and data block configuration information) and configure the low complexity decoder based on those headers.

In each of FIGS. 6 and 7, the level 2 and level 1 encoding operations may include the steps of transformation, quantization and entropy encoding (e.g., in that order). These steps may be implemented in a similar manner to the operations shown in FIGS. 4 and 5. The encoding operations may also include residual ranking, weighting and filtering. Similarly, at the decoding stage, the residuals may be passed through an entropy decoder, a de-quantizer and an inverse transform module (e.g., in that order). Any suitable encoding and corresponding decoding operation may be used. Preferably however, the level 2 and level 1 encoding steps may be performed in software (e.g., as executed by one or more central or graphical processing units in an encoding device).

The transform as described herein may use a directional decomposition transform such as a Hadamard-based transform. Both may comprise a small kernel or matrix that is applied to flattened coding units of residuals (i.e. 2×2 or 4×4 blocks of residuals). More details on the transform can be found for example in patent applications PCT/EP2013/059847 or PCT/GB2017/052632, which are incorporated herein by reference. The encoder may select between different transforms to be used, for example between a size of kernel to be applied.

The transform may transform the residual information to four surfaces. For example, the transform may produce the following components or transformed coefficients: average, vertical, horizontal and diagonal. A particular surface may comprise all the values for a particular component, e.g. a first surface may comprise all the average values, a second all the vertical values and so on. As alluded to earlier in this disclosure, these components that are output by the transform may be taken in such embodiments as the coefficients to be quantized in accordance with the described methods. A quantization scheme may be useful to create the residual signals into quanta, so that certain variables can assume only certain discrete magnitudes. Entropy encoding in this example may comprise run length encoding (RLE), then processing the encoded output is processed using a Huffman encoder. In certain cases, only one of these schemes may be used when entropy encoding is desirable.

In summary, the methods and apparatuses herein are based on an overall approach which is built over an existing encoding and/or decoding algorithm (such as MPEG standards such as AVC/H.264, HEVC/H.265, etc. as well as non-standard algorithm such as VP9, AV1, and others) which works as a baseline for an enhancement layer which works accordingly to a different encoding and/or decoding approach. The idea behind the overall approach of the examples is to hierarchically encode/decode a data plane as opposed to the use block-based approaches as used in the MPEG family of algorithms. Hierarchically encoding a data plane includes generating residuals for the full data plane, and then a decimated data plane and so on.

As indicated above, the processes may be applied in parallel to coding units or blocks of different data planes included within a frame as there are no inter-block dependencies. The encoding of each data plane may be performed in parallel (e.g., such that the operations are duplicated according to (number of frames)*(number of data planes components)*(number of coding units per frame)). It should also be noted that different data planes may have a different number of coding units per frame, e.g. a metadata data plane may be encoded at a lower array resolution than point cloud position data.

Thus, as illustrated and described above, the output of the decoding process is an (optional) base reconstruction, and an original signal reconstruction at a higher level.

In the examples described herein residuals are encoded by an encoding pipeline. This may include transformation, quantization and entropy encoding operations. It may also include residual ranking, weighting and filtering. Residuals are then transmitted to a decoder, e.g. as L-1 and L-2 enhancement streams, which may be combined with a base stream as a hybrid stream (or transmitted separately). In one case, a bit rate is set for a hybrid data stream that comprises the base stream and both enhancements streams, and then different adaptive bit rates are applied to the individual streams based on the data being processed to meet the set bit rate (e.g., high-quality video that is perceived with low levels of artefacts may be constructed by adaptively assigning a bit rate to different individual streams, even at a frame by frame level, such that constrained data may be used by the most perceptually influential individual streams, which may change as the image data changes).

The sets of residuals as described herein may be seen as sparse data, e.g. in many cases there is no difference for a given array element or group of elements and the resultant residual value is zero. When looking at the distribution of residuals much of the probability mass is allocated to small residual values located near zero—e.g. for certain videos values of −2, −1, 0, 1, 2 etc. occur the most frequently. In certain cases, the distribution of residual values is symmetric or near symmetric about 0.

Residuals may be treated as a two-dimensional image in themselves, e.g. a delta image of differences. Seen in this manner the sparsity of the data may be seen to relate features like "dots", small "lines", "edges", "corners", etc. It has been found that these features are typically not fully correlated (e.g., in space and/or in time). They have characteristics that differ from the characteristics of the original plane data they are derived from (e.g., views of the point cloud).

As described above, embodiments of the invention utilise tier-based hierarchical coding formats to encode and decode point cloud data. Non-limiting examples of how tier-based hierarchical coding formats are utilised to encode and decode point cloud data are described with reference to FIGS. 8 to 12.

Figure 8:
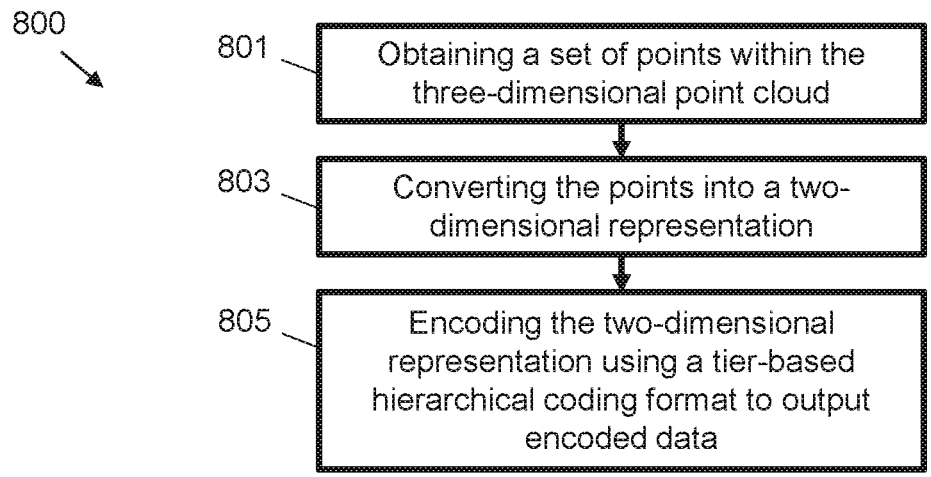
FIG. 8 is a flow chart showing a method of encoding a three-dimensional point cloud.

FIG. 8 shows a flow chart of a method 800 of encoding a three-dimensional point cloud. The method 800 comprises obtaining 801 a set of points within the three-dimensional point cloud, a point within the set of points having a co-ordinate in three-dimensions. The coordinate in three-dimensions may be with respect to a given point of reference (e.g. an origin of a frame of reference for the 3D point cloud). The method further comprises converting 803 the points into a two-dimensional representation. For a point within the set of points, information describing the co-ordinate is represented as a location within the two-dimensional representation and a value at the location. The method further comprises encoding 805 the two-dimensional representation using a tier-based hierarchical coding format to output encoded data. The tier-based hierarchical coding format may be in line with the examples of tier-based hierarchical coding formats discussed in with reference to FIGS. 2 to 7. The tier-based hierarchical coding format encodes the two-dimensional representation as a plurality of layers. The plurality of layers represents echelons of data used to progressively reconstruct the signal at different levels of quality.

The two-dimensional representation may comprise a two-dimensional view of the three-dimensional point cloud. In embodiments, for the point within the set of points, the location within the two-dimensional representation is determined via a projection of the point onto the two-dimensional view, and the value at the location is determined as a depth of the point perpendicular to the two-dimensional view. In other cases, the value may comprise a point intensity (such as a luma or chroma intensity), wherein multiple views may be processed using known 3D reconstruction methods to convert the 2D projections back to a 3D point cloud. In certain cases, additional metadata encoded as additional data planes and/or supplementary data for the encoded bit stream is used to facilitate the reconstruction (e.g. may indicate depth, point identifiers to allow point view correlation, and/or a location and orientation for the view).

In embodiments, a plurality of two-dimensional representations are generated that comprise a plurality of corresponding two-dimensional views. In these embodiments, one or more of a number of corresponding two-dimensional views and a set of orientations for said two-dimensional views may be determined so as to specify the set of points.

The method 800 may further comprise encoding the two-dimensional representation as a custom colour plane for a frame of video using a tier-based hierarchical coding scheme. In embodiments, the set of points vary in time and the method 800 is repeated for a plurality of time steps. Optionally, the time step is associated with the frame of video. In certain cases, each view may be encoded as a standard frame of video data (e.g. with three colour components such as YUV) together with a data plane of metadata providing further properties of points in the point cloud, where each point has a 2D location in the frame of video data.

The points of the point cloud data may be converted into the two-dimensional representation by obtaining a set of property values associated a point in the set of points; and converting the set of property values to one or more additional two-dimensional representations. In embodiments, the location within the two-dimensional representation is used as an index for the point in the one or more additional two-dimensional representations and the set of property values are set as values at the location in the one or more additional two-dimensional representations. Properties that are represented with more than one value can be represented as a plurality of additional two-dimensional representations. In embodiments, the set of property values relate to one or more of colours for a right eye, colours for a left eye, alpha channel, components of normal vectors, information on characteristics of the object and coordinates of motion vectors.

In embodiments, for a point within the set of points, co-ordinate values within the first and second dimensions of the three dimensions are used to indicate a location within the two-dimensional representation and a co-ordinate value in the third dimension is represented as a value at the location.

In embodiments, the plurality of layers represents different spatial resolutions for the two-dimensional representation. The plurality of layers may comprise a base layer and one or more layers of residual data (e.g. as described with respect to FIGS. 2 to 7 above). The residual data can indicate a difference between a version of the two-dimensional representation reconstructed using a first, lower level and a version of the two-dimensional representation at a second, higher level.

In embodiments, the method 800 further comprises determining a bit depth for the two-dimensional representation. In embodiments, the method 800 further comprises encoding the value at the location in the two-dimensional representation according to the bit depth.

In embodiments, the method 800 further comprises determining a set of bit depths for the plurality of layers, at least two of the plurality of layers having different bit depths. In embodiments, the method 800 further comprises encoding the two-dimensional representation using layer encodings at the determined set of bit depths.

In embodiments, the method 800 further comprises obtaining a loss level for the encoding, the loss level being selected from a set including one or more of lossless and lossy levels. In embodiments, the method 800 further comprises encoding the two-dimensional representation at the obtained loss level.

Figure 9:
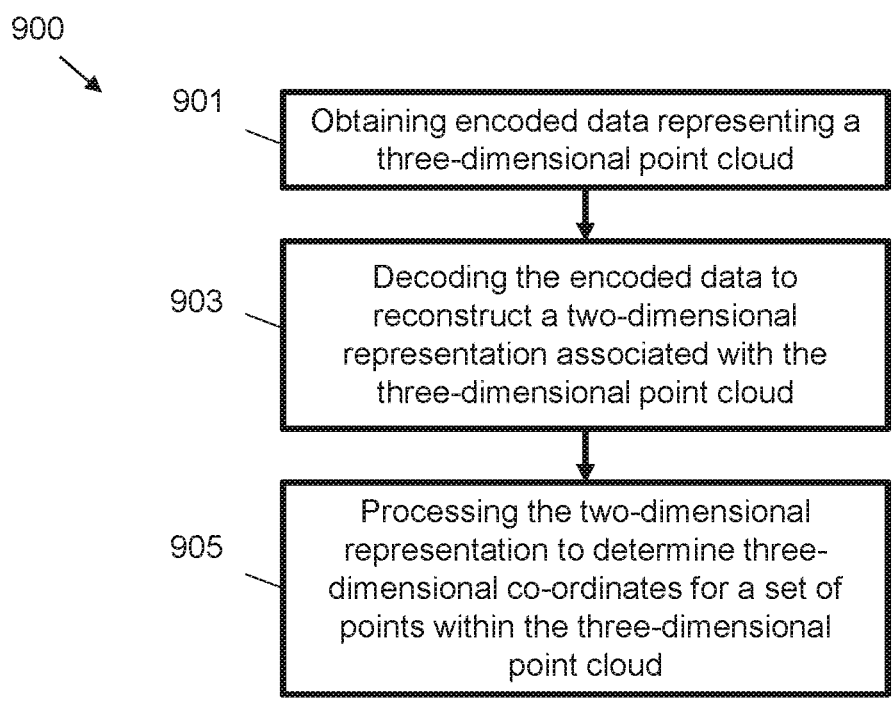
FIG. 9 is a flow chart showing a method of decoding a three-dimensional point cloud.

FIG. 9 shows a flow chart of a method 900 of decoding a three-dimensional point cloud. The decoding method 900 is a corresponding method to the encoding method 800.

The decoding method 900 comprises obtaining 901 encoded data representing the three-dimensional point cloud. The encoded data is encoded using a tier-based hierarchical coding format. As described above, the tier-based hierarchical coding format encodes frames comprising one or more data planes as a plurality of layers, the plurality of layers representing different levels of quality. In other words, the plurality of layers represent echelons of data used to reconstruct the signal at different levels of quality. Examples of the tier-based hierarchical coding format are discussed above in reference to FIGS. 2 to 7.

The decoding method 900 comprises decoding 903 the encoded data to reconstruct a two-dimensional representation associated with the three-dimensional point cloud. The decoding 903 may reconstruct a multi-planar two-dimensional representation associated with the three-dimensional point cloud.

The method 900 comprises processing 905 the two-dimensional representation to determine three-dimensional co-ordinates for a set of points within the three-dimensional point cloud. In certain examples, information describing a three-dimensional co-ordinate is represented as a location within the two-dimensional representation and a value at the location. The processing 905 may further determine other associated attributes for the set of points within the three-dimensional point cloud.

The encoding method 800 and decoding method 900 represent complementary aspects that may be implemented with corresponding encoders and decoders. These encoders and decoders may be applied to data streams and/or stored data files. In some non-limiting embodiments, decoding is performed by offloading at least scaling operations to one or more tensor cores of a GPU.

In embodiments, the two-dimensional representation comprises a two-dimensional view of the three-dimensional point cloud. For a point within the set of points, the three-dimensional co-ordinate is determined by a reverse projection from the location within the two-dimensional representation. The value at the location indicates a depth of the point perpendicular to the two-dimensional view.

In embodiments, obtaining 901 encoded data comprises obtaining a frame of encoded two-dimensional data, the frame having a plurality of associated custom data planes; and obtaining encoded data associated with the plurality of associated custom data planes. The custom data planes here may be seen as custom "colour" planes that carry point cloud data instead of the tristimulus colour values for a conventional frame of video data.

In embodiments, decoding 903 the encoded data for a custom data plane comprises obtaining data associated with the plurality of layers for a custom data plane. In embodiments, decoding 903 the encoded data for a custom data plane comprises reconstructing a base layer within the plurality of layers at a first, lower resolution. In embodiments, decoding 903 the encoded data for a custom data plane comprises reconstructing a version of the two-dimensional representation by upsampling the base layer. In embodiments, decoding 903 the encoded data for a custom data plane comprises applying a residual layer within the plurality of layers at a second, higher resolution to the reconstructed version of the two-dimensional representation to generate a version of the two-dimensional representation at the second, higher resolution.

In embodiments, the method 900 further comprises obtaining an indication of a region of interest associated with the three-dimensional point cloud. In embodiments, the method 1000 further comprises decoding a subset of the encoded data to extract a two-dimensional representation associated with the region of interest, wherein the set of points comprise points within the region of interest. This is explained in more detail below with reference to FIG. 12.

The subset of the encoded data may be decoded by: obtaining encoded data associated with the plurality of layers for a custom data plane; decoding at least a portion of a base layer that is associated with the region of interest, the base layer being within the plurality of layers at a first, lower resolution; decoding a portion of a residual layer within the plurality of layers at a second, higher resolution; reconstructing a version of the two-dimensional representation by upsampling the portion of the base layer; and applying the decoded portion of the residual layer to the reconstructed version of the two-dimensional representation to generate a version of the two-dimensional representation at the second, higher resolution.

In embodiments, the method 900 further comprises obtaining an indication of a desired resolution for rendering at least a portion of the three-dimensional point cloud. In embodiments, the method 900 further comprises determining a subset of the plurality of layers to decode to provide the desired resolution. In embodiments, the method 900 further comprises decoding encoded data for the subset of the plurality of layers to reconstruct one or more two-dimensional representations associated with the desired resolution. In embodiments, the method 900 further comprises processing the one or more two-dimensional representations associated with the desired resolution to determine three-dimensional co-ordinates corresponding to the desired resolution for the set of points within the three-dimensional point cloud.

In embodiments, the tier-based hierarchical coding format is associated with a tier-based hierarchical video coding scheme. In such embodiments, decoding the encoded data comprises: for a frame of encoded video within the tier-based hierarchical video coding scheme, extracting encoded data for a plurality of custom data planes associated with the frame, the plurality of custom data planes encoding information regarding three-dimensional coordinates for points within the three-dimensional point cloud and one or more properties of said points; applying a decoder for the tier-based hierarchical video coding scheme to the extracted encoded data to reconstruct the plurality of custom data planes at a desired level of detail, wherein the plurality of custom data planes comprise a plurality of two-dimensional representations associated with the three-dimensional point cloud; and processing the plurality of custom data planes to reconstruct a state of the set of points within the three-dimensional point cloud at a point in time associated with the frame.

The methods 800 and 900 each allow the tier-based hierarchical coding format to be leveraged to efficiently encode point clouds. For example, the three-dimensional model as represented by the point cloud may be converted into one or more two-dimensional representations, wherein each attribute of the point cloud (e.g., depth with respect to the reference, colours, coordinates of the normal vector, presence of motion, coordinates of the motion vector(s), etc.) may then be encoded as if they were colour planes associated with a frame of video data. Each plane may have a different bit depth, and be encoded according to different criteria (e.g., some in lossless mode, other in lossy mode).

The decoding method 900 (in conjunction with the encoding method 800) allows for partial and/or region of interest decoding of the compressed data, based on the viewpoint and viewport size that are meant to be rendered from time to time. For instance, if the viewpoint is far, it may not be necessary to decode the point cloud up to the highest level of quality. Conversely, if the viewpoint is very near, it may be sufficient to decode the region-of-interest of the point cloud that is likely to be included in the field of view. This property allows to keep in device memory much larger and much more detailed "scenes" than otherwise possible with a given device memory, since a material portion of the point cloud data will not require to be expanded to uncompressed form. It also allows to distribute a same encoded file to multiple devices with different processing power, which will all be able to decode and render the point cloud in real time, just at different levels of quality.

In certain examples, the two-dimensional representation may comprise a two-dimensional (or "2.5D") view of the three-dimensional point cloud, and wherein, for the point within the set of points, the location within the two-dimensional representation is determined via a projection of the point onto the two-dimensional view, and the value at the location is determined as a depth of the point perpendicular to the two-dimensional view. A suitable number of similarly structured 2.5D views from distinct known reference viewpoints can integrate the point cloud obtained from a main viewpoint with additional points that are "occluded" (i.e., not visible) from the main viewpoint, thus completing the point cloud.

Although examples are discussed with respect to point clouds, they may also apply to different three-dimensional models such as surface element models. A pose (e.g. a position and orientation) that defines each view may be encoded together with the encoded data (e.g. in metadata and the like). The pose data may be decoded during decoding to determine the view that was used for a particular set of two-dimensional representations. In certain embodiments, a plurality of two-dimensional representations are generated that comprise a plurality of corresponding two-dimensional views, wherein one or more of a number of corresponding two-dimensional views and a set of orientations for said two-dimensional views are determined so as to specify the set of points. For examples, a minimum number of views may be calculated that allow for each point in the set of points to be reconstructed. This may take account of any overlaps within the two-dimensional representations (e.g. points that have common XY coordinates say but different Z co-ordinates). The poses for the views may be selected such that the set of points are separable across the set of views.

Therefore, in embodiments of method 800, encoding the two-dimensional representation comprises encoding the two-dimensional representation as a custom colour plane for a frame of video using a tier-based hierarchical video coding scheme. For example, the two-dimensional representations may represent views of a three-dimensional scene, which may be encoded as normal frames of video, but having a custom number of "colour" channels or planes that contains information needed to represent the point cloud, such as depth information and/or point properties. In such embodiments, changes to the tier-based hierarchical video coding scheme may be minimised (and in certain cases may not be required). The only change that may be required is to indicate that instead of the conventional three colour planes (such as YUV or RGB), there are k custom data planes (which may be referred to as "custom colour planes"). These may be considered as two-dimensional arrays but where the normal colour intensity data is replaced with point cloud data.

In embodiments, the set of points vary in time and the method is repeated for a plurality of time steps, wherein a time step is associated with the frame of video. In this manner, there may be multiple frames (which may be implemented as sets of custom data planes) per time step representing different views at a given moment in time. Static point clouds may be represented by consecutive frames where consecutive frames represent an iteration through the different available views. In embodiments, multiple views may be represented under a single frame data structure in the tier-based hierarchical video coding scheme, with the data for different views being represented as different custom data frames. In these cases, a single frame may have multiple virtual frames that are represented by different data planes associated with the single frame (e.g. data planes 1-5 may be associated with view 1, data planes 6-10 with view 2 etc.). In certain cases, frames may be encoded with metadata detailing their specific resolution (i.e., x and y ranges), with may vary for each frame and/or for each view.

In embodiments, converting the points into a two-dimensional representation further comprises: obtaining a set of property values associated to a point in the set of points; and converting the set of property values to one or more additional two-dimensional representations, wherein the location within the two-dimensional representation is used as an index for the point in the one or more additional two-dimensional representations and the set of property values are set as values at the location in the one or more additional two-dimensional representations. These additional two-dimensional representations may be the data planes for one or more frames as described above. Properties that are represented with more than one value (e.g. normal vectors with 3 elements) may be represented as a plurality of additional two-dimensional representations. The set of property values may relate to one or more of colours for a right eye, colours for a left eye, normal vectors, and motion vectors.

In certain embodiments, for a point within the set of points, co-ordinate values within the first and second dimensions of the three dimensions are used to indicate a location within the two-dimensional representation and a co-ordinate value in the third dimension is represented as a value at the location. For example, a view could be a view of the XY plane where depth is then a Z value that can be represented by the value at the location. In some non-limiting embodiments, the Z value is representative of a mathematical function of actual depth (e.g., by way of non-limiting example, 1/depth) in order to provide more precision to the depth information of points that are closer to the reference point. For views that are not co-planar with the XYZ axes, the original three-dimensional co-ordinate may be projected onto a given view plane and a depth may be determined as the normal or perpendicular distance to the view plane.

The plurality of layers in a hierarchy may represent different spatial resolutions for the two-dimensional representation. For example, different layers may be generated by downsampling a first high-resolution two-dimensional representation. The plurality of layers may comprise a base layer (i.e. a lowest layer in the hierarchy) and one or more layers of residual data. The residual data may indicate a difference between a version of the two-dimensional representation reconstructed using a first, lower level of quality and a version of the two-dimensional representation at a second, higher level of quality (e.g. an upsampled lower level and a current level). In some non-limiting embodiments, different layers of data may be encoded using different encoding methods. In some non-limiting embodiments, the base layer may be encoded by means of a traditional block-based encoding method.

Some embodiments may comprise determining a bit depth for the two-dimensional representation and encoding the value at the location in the two-dimensional representation according to the bit depth. For example, the input high-resolution two-dimensional representation may only need 1 bit to encode binary properties but may require 16-bits to encode properties that have more than 256 possible values. Example hierarchical video coding schemes may be easily configured to have custom bit depths for the input. The plurality of layers may also be encoded at a number of different bit depths. For example, the method may comprise: determining a set of bit depths for the plurality of layers, at least two of the plurality of layers having different bit depths; and encoding the two-dimensional representation using layer encodings at the determined set of bit depths. Smaller bit depths (e.g. 8 bit and below) may provide lossy encoding (e.g. equivalent to quantising continuous values with 256 bins for 8-bit) but may provide lower bandwidth encoded streams and smaller file sizes.

In embodiments, the method comprises: obtaining a loss level for the encoding, the loss level being selected from a set including one or more of lossless and lossy levels; and encoding the two-dimensional representation at the obtained loss level. Lossy encodings may be implemented by applying quantisation and/or transformations as part of the encoding process.

The two-dimensional representation may comprise a two-dimensional view of the three-dimensional point cloud, and wherein, for a point within the set of points, the three-dimensional co-ordinate may be determined by a reverse projection from the location within the two-dimensional representation, where the value at the location indicates a depth of the point perpendicular to the two-dimensional view. During decoding, obtaining encoded data may comprise: obtaining a frame of encoded two-dimensional data, the frame having a plurality of associated custom data planes; and obtaining encoded data associated with the plurality of associated custom data planes. For example, one or more two-dimensional representations providing different views of the point cloud as described above may be represented as different data planes for a "frame" of encoded video. Decoding the encoded data for a custom colour plane may then comprise obtaining data associated with the plurality of layers for a custom data plane.

In certain examples, this can comprise reconstructing a base layer within the plurality of layers at a first, lower resolution. This may be a lowest resolution. A version of the two-dimensional representation may be reconstructed by upsampling the base layer. A residual layer within the plurality of layers at a second, higher resolution may be applied to the reconstructed version of the two-dimensional representation to generate a version of the two-dimensional representation at the second, higher resolution. These steps may be repeated for multiple layers within the hierarchy to construct increasingly detailed representations of the point clouds. However, intermediate reconstructed versions of the video may also be extracted, e.g. to save processing resources if a high-resolution version of the point cloud is not desired or required. For example, for movement of a robotic device distant from the rendering viewpoint, coarse motor movements may only require an initial low-resolution point cloud. This may be constructed using the intermediate reconstructed versions of the layer and so allow for faster decoding. In some non-limiting embodiments, decoding of at least one plane may be performed up to the highest level of quality, while decoding of at least another plane may be performed only up to a given level of quality lower than the highest, based on a parameter, such as the distance from the view point from which the rendering is to be performed.

The method may comprise obtaining an indication of a region of interest associated with the three-dimensional point cloud; decoding a subset of the encoded data to extract a two-dimensional representation associated with the region of interest, wherein the set of points comprise points within the region of interest. Specifying a region of interest may allow for partial decoding of the two-dimensional representations to only reconstruct volumes of the point cloud (e.g. certain points) that are within a volume of interest. The region of interest may correspond to a portion of a three-dimensional model viewed by a user and/or a point that needs locating and properties extracting. In this case, decoding a subset of the encoded data may comprise: obtaining encoded data associated with the plurality of layers for a custom data plane; decoding at least a portion of a base layer that is associated with the region of interest, the base layer being within the plurality of layers at a first, lower resolution; decoding a portion of a residual layer within the plurality of layers at a second, higher resolution; reconstructing a version of the two-dimensional representation by upsampling the portion of the base layer; and applying the decoded portion of the residual layer to the reconstructed version of the two-dimensional representation to generate a version of the two-dimensional representation at the second, higher resolution. In one case, the whole of the base layer may be decoded, as this may be performed relatively quickly, while higher resolution layers may only be partially decoded to save processing resources and time.

In other non-limiting embodiments, decoding of at least one plane may be performed for the whole plane, while decoding of at least another plane may be performed only for a given region of interest, based on a parameter, such as the expected field of view that is to be included in the rendering.

In some non-limiting embodiments, decoding of at least one of the planes may be performed up to a level of quality lower than the highest based on timing requirements to complete the decoding, so as to complete the decoding process within a specified time. This allows a same encoded point cloud to be decoded and rendered at different levels of qualities based on the processing power available at the decoding and rendering device. In some non-limiting embodiments, a point cloud is encoded at a very high resolution and quality, based on the processing power available in the highest power decoding and rendering devices: the same encoded file is also sent to the lowest power decoding and rendering devices, which will still be able to process it and render it in real time, just at a lower level of quality.

In certain cases, the method may comprise: obtaining an indication of a desired resolution for rendering at least a portion of the three-dimensional point cloud; determining a subset of the plurality of layers to decode to provide the desired resolution; and decoding encoded data for the subset of the plurality of layers to reconstruct one or more two-dimensional representations associated with the desired resolution; and processing the one or more two-dimensional representations associated with the desired resolution to determine three-dimensional co-ordinates corresponding to the desired resolution for the set of points within the three-dimensional point cloud. For example, a resolution in three-dimensional space may be provided by a user or a process and the method may only decode a subset of the plurality of layers that are needed to generate a representation of the point cloud that is close to the desired resolution.

In certain cases, the tier-based hierarchical coding format is associated with a tier-based hierarchical video coding scheme and decoding the encoded data comprises: for a frame of encoded video within the tier-based hierarchical video coding scheme, extracting encoded data for a plurality of custom data planes associated with the frame, the plurality of custom data planes encoding information regarding three-dimensional co-ordinates for points within the three-dimensional point cloud and one or more properties of said points; applying a decoder for the tier-based hierarchical video coding scheme to the extracted encoded data to reconstruct the plurality of custom data planes at a desired level of detail and within a desired time, wherein the plurality of custom data planes comprise a plurality of two-dimensional representations associated with the three-dimensional point cloud; and processing the plurality of custom data planes to reconstruct a state of the set of points within the three-dimensional point cloud at a point in time associated with the frame.

Figure 10:
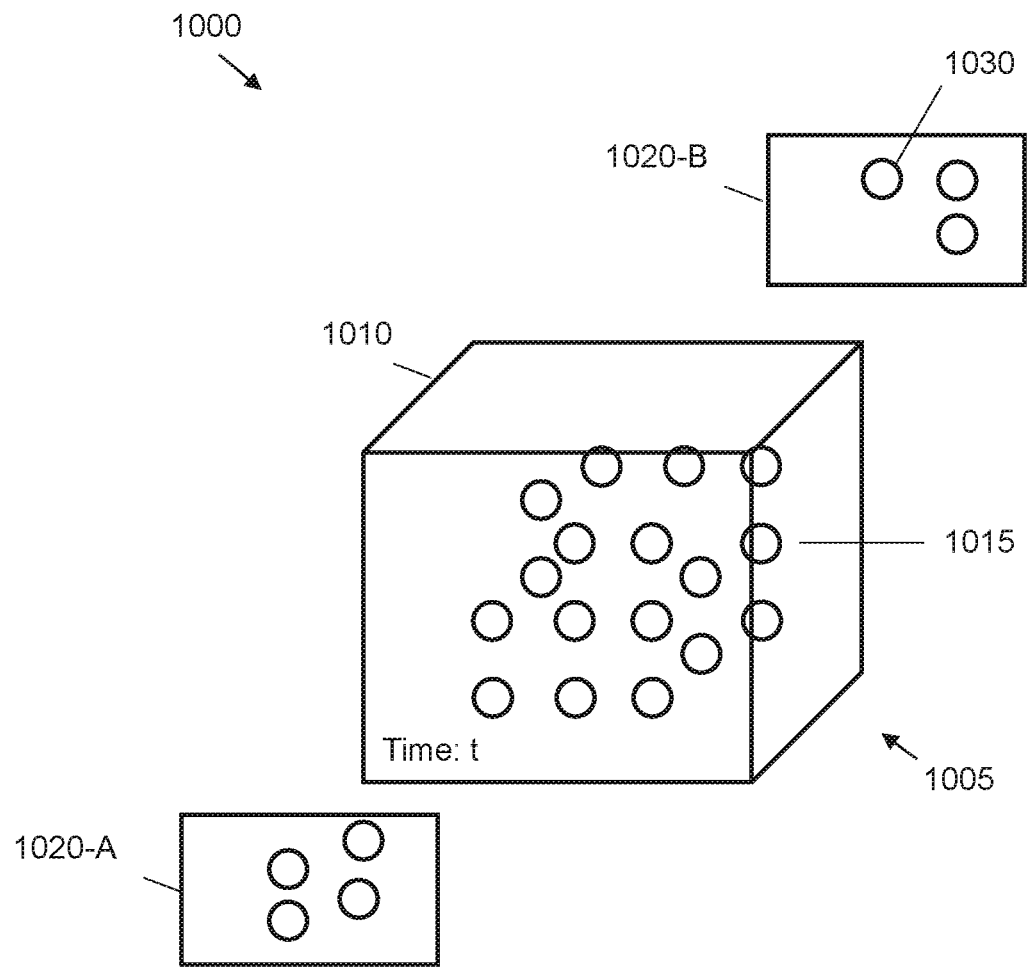
FIG. 10 shows a high-level schematic of different views of a three-dimensional point cloud.
Figure 11:
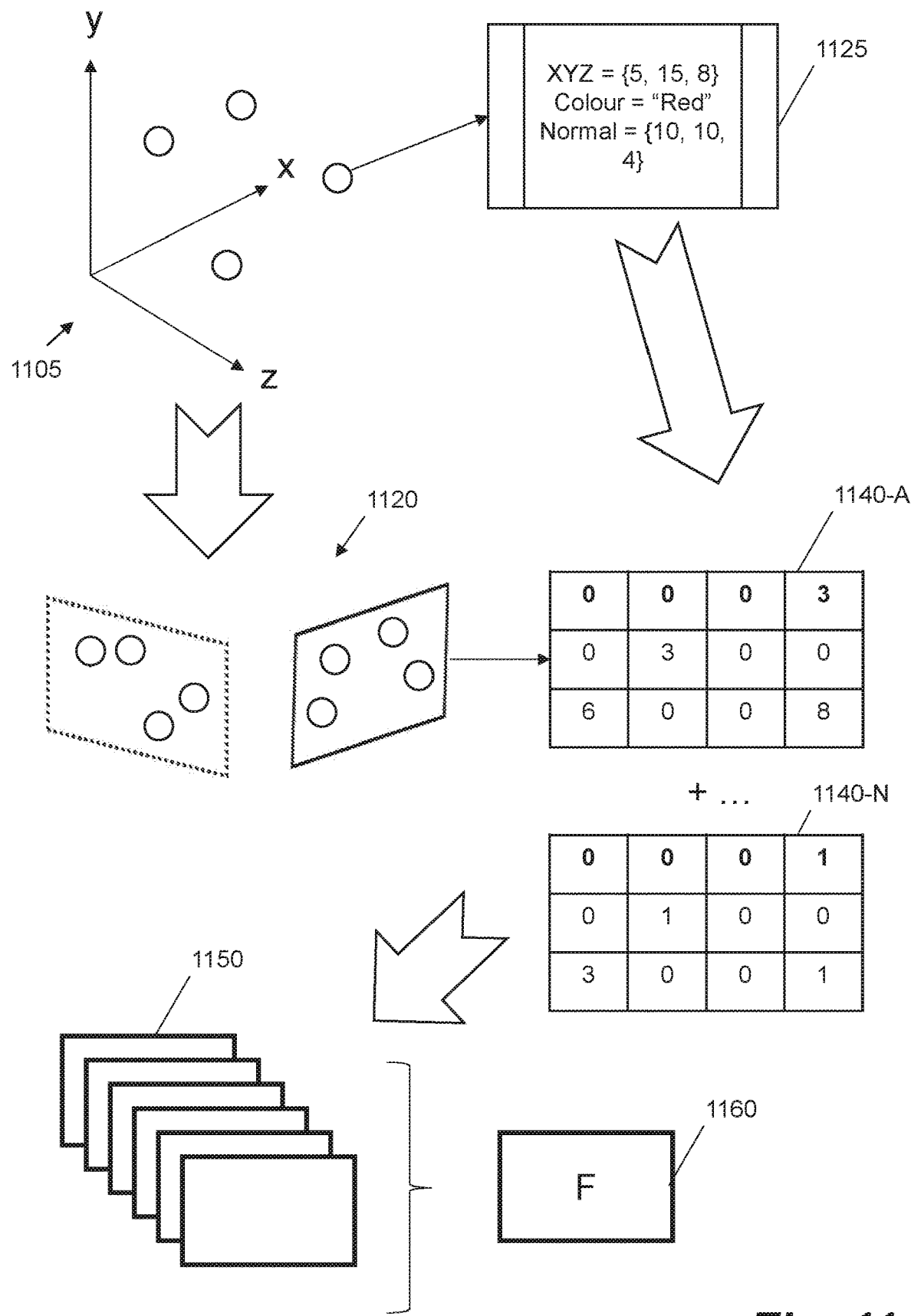
FIG. 11 shows a high-level schematic of using a view of a point cloud to construct a projected two-dimensional representation.

FIGS. 10 and 11 show how different two-dimensional (2D) views of a three-dimensional (3D) point cloud may be generated and encoded.

FIG. 10 shows an example 1000 of a 3D point cloud 1005. The point cloud 1005 is defined in relation to a frame of reference 1010, which may comprise x, y and z axes with a defined origin. FIG. 10 shows a snapshot of the point cloud 1005 at one point in time t. The methods described herein may be repeated for a series of samples at different times t to represent a dynamic point cloud. The point cloud 1005 comprises a series of points 1015, which comprise a particular 3D co-ordinate and associated data, i.e. a point in the defined 3D space. In one case, a point may represent a surface of an object within the space. It should be noted that the points in this example have been enlarged for ease of explanation, and in implementations they may not have a 2- or 3-D spatial extent.

FIG. 10 shows two example views 1020 of the point cloud: a first view 1020-A and a second view 1020-B. Two views are shown just for example and different numbers of views from 1 to n may be provided. Each view 1020 represents the points 1015 as projections onto the view plane (e.g., as projections onto particular 2D pixel locations). In one case, each point as represented in the view plane has a value. This value may represent a depth and/or a colour value. If the value represents a depth then the view plane may be encoded as an additional data plane together with YUV colour component planes for the view. If only the point location is required, and there is no point overlap or occlusion, then only one view plane with depth information may be required to reconstruction the point cloud (e.g. by projecting back with the depth data given metadata describing the view plane location and orientation).

FIG. 11 shows an example of the encoding process for a point cloud 1105. The point cloud 1105 may be the point cloud 1005 of FIG. 10. In this example, each point is defined as a location in the 3D space plus various metadata. In FIG. 11, this is shown as point data 1125, which comprise a 3D coordinate (with x, y, z values), colour data (e.g., in the form of a colour classification or tristimulus—RGB or YUV—value) and a normal vector representing a normal of a surface the point belongs to. Different point cloud representations may have different metadata depending on the implementation.

FIG. 11 shows various views 1120 of the point cloud that may correspond to view planes 1020 in FIG. 10. On the right-hand side of FIG. 11 is shown 2D arrays 1140 that encode values associated with points that are projected onto each view plane. For example, a first data plane 1140-A encodes values for four points that are projected onto particular array positions (e.g. represented by an x and y coordinate in the 2D data plane). The values may comprise encoding of the point data 1125 and/or may represent a depth from the view plane (e.g. distance of the point in a direction normal to the view plane). In FIG. 11, N data planes are generated to encode the point data 1125, which form the data plane set 1150 that represent the different plane components of frame 1160. Hence, the data plane set 1150 may be encoded in the same manner as colour components or planes for a frame of video data, in this case there being N rather than 3 different planes. The process of FIG. 11 may be repeated for a plurality of frames over time. For example, an object moving in space may be represented by a single moving point that is encoded as shown.

Figure 12:
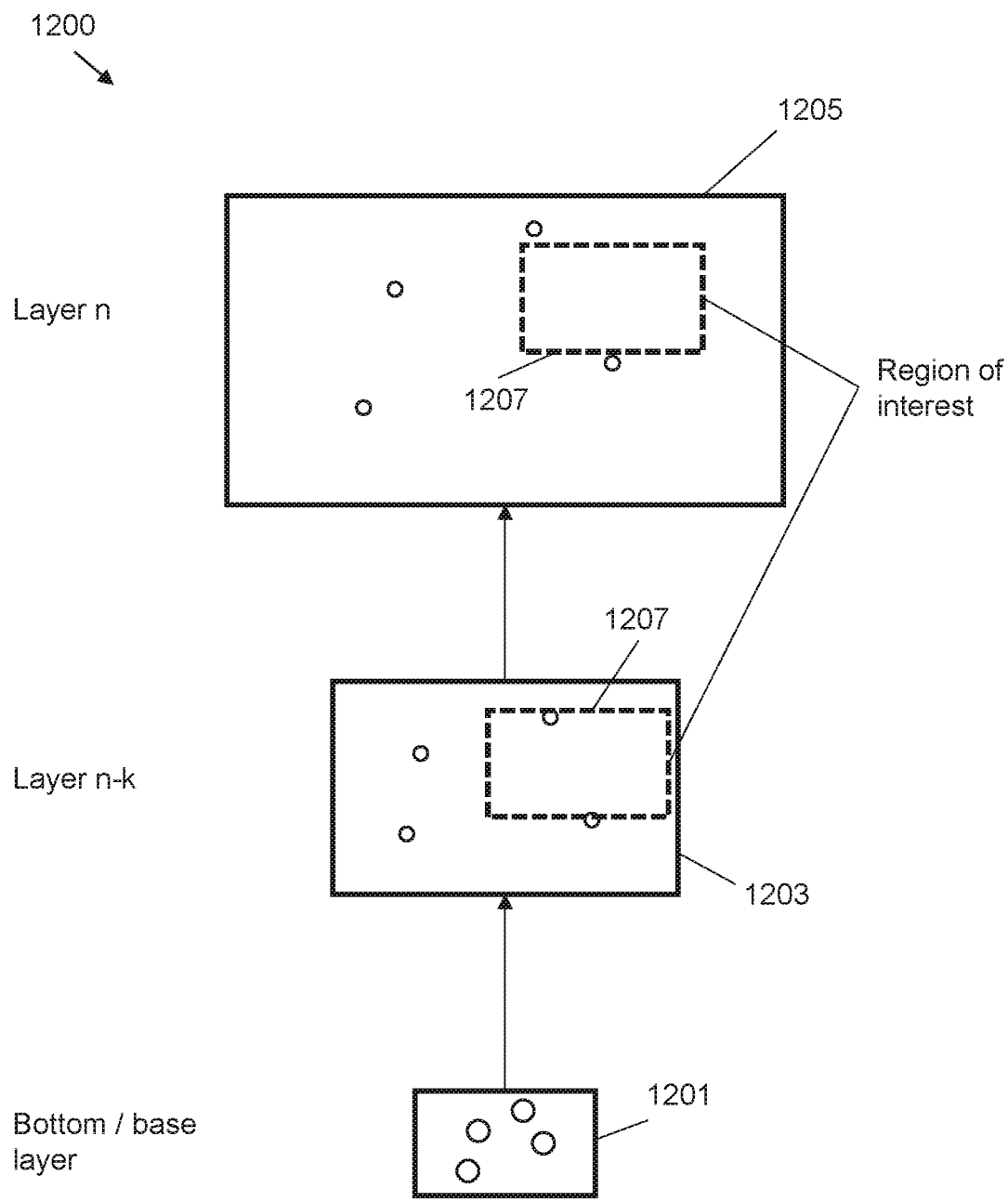
FIG. 12 shows a high-level schematic of how a region of interest may be indicated so that all the encoded data from each layer need not be decoded.

FIG. 12 shows how a region of interest may be indicated so that all the encoded data from each layer need not be decoded. In FIG. 12, the bottom or base layer 1201 is decoded to generate a two-dimensional representation but for higher layers (1203, 1205) only data relating to the region of interest 1207 may be decoded. For example, the bottom or base layer 1201 may allow a coarse or low-resolution version of the point cloud to be constructed, yet a higher resolution version (e.g. having a more accurate position of the points) may only be required for the region of interest 1207, which may be a small volume within the original point cloud space. If the residual data of the layers is organised as blocks (e.g. 2×2 or 4×4 groups of pixels) that may be independently encoded and decoded (e.g. without temporal or spatial dependency on other blocks), then only blocks relating to the region of interest 1207 may be extract and decoded to derive data relating to points within that region of interest 1207.

At least some aspects of the examples described herein with reference to the drawings may be implemented as specific chipsets, such as Application Specific Integrated Circuits or configured Field Programmable Gate Arrays, or computer processes performed in processing systems or processors, as well as computer programs, for example computer programs on or in a carrier, adapted for putting the examples into practice. The carrier may be any entity or device capable of carrying the program. The techniques described herein may be implemented in software or hardware, or may be implemented using a combination of software and hardware. They may include configuring an apparatus to carry out and/or support any or all of techniques described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of encoding a three-dimensional point cloud comprising:
    obtaining a set of points within the three-dimensional point cloud, a point within the set of points having a co-ordinate in three-dimensions;
    converting the points into a two-dimensional representation, wherein, for a point within the set of points, information describing the co-ordinate is represented as a location within the two-dimensional representation and a value at the location; and
    encoding the two-dimensional representation using a tier-based hierarchical coding format to output encoded data, wherein the tier-based hierarchical coding format encodes the two-dimensional representation as a plurality of layers, the plurality of layers representing echelons of data used to progressively reconstruct the signal at different levels of quality.

2. The method of claim 1, wherein the two-dimensional representation comprises a two-dimensional view of the three-dimensional point cloud, and wherein, for the point within the set of points, the location within the two-dimensional representation is determined via a projection of the point onto the two-dimensional view, and the value at the location is determined as a depth of the point perpendicular to the two-dimensional view.

3. The method of claim 2, wherein a plurality of two-dimensional representations are generated that comprise a plurality of corresponding two-dimensional views, wherein one or more of a number of corresponding two-dimensional views and a set of orientations for said two-dimensional views are determined so as to specify the set of points.

4. The method of claim 1, wherein encoding the two-dimensional representation comprises:
    encoding the two-dimensional representation as a custom color plane for a frame of video using a tier-based hierarchical coding scheme.

5. The method of claim 4, wherein the set of points vary in time and the method is repeated for a plurality of time steps, wherein a time step is associated with the frame of video.

6. The method of claim 1, wherein converting the points into a two-dimensional representation further comprises:
    obtaining a set of property values associated a point in the set of points; and converting the set of property values to one or more additional two-dimensional representations, wherein the location within the two-dimensional representation is used as an index for the point in the one or more additional two-dimensional representations and the set of property values are set as values at the location in the one or more additional two-dimensional representations.

7. The method of claim 6, wherein properties that are represented with more than one value are represented as a plurality of additional two-dimensional representations and/or wherein the set of property values relate to one or more of colors for a right eye, colors for a left eye, alpha channel, components of normal vectors, information on characteristics of the object and coordinates of motion vectors.

8. The method of claim 1, wherein, for a point within the set of points, co-ordinate values within the first and second dimensions of the three dimensions are used to indicate a location within the two-dimensional representation and a co-ordinate value in the third dimension is represented as a value at the location.

9. The method of claim 1, wherein the plurality of layers represents different spatial resolutions for the two-dimensional representation.

10. The method of claim 1, comprising:
determining a bit depth for the two-dimensional representation; and
encoding the value at the location in the two-dimensional representation according to the bit depth.

11. The method of claim 1, comprising:
determining a set of bit depths for the plurality of layers, at least two of the plurality of layers having different bit depths; and
encoding the two-dimensional representation using layer encodings at the determined set of bit depths.

12. The method of claim 1, comprising:
obtaining a loss level for the encoding, the loss level being selected from a set including one or more of lossless and lossy levels; and
encoding the two-dimensional representation at the obtained loss level.

13. A method of decoding a three-dimensional point cloud comprising:
obtaining encoded data representing the three-dimensional point cloud, the encoded data being encoded using a tier-based hierarchical coding format, wherein the tier-based hierarchical coding format encodes frames of data as a plurality of layers, the plurality of layers representing different levels of quality;
decoding the encoded data to reconstruct a two-dimensional representation associated with the three-dimensional point cloud; and
processing the two-dimensional representation to determine three-dimensional coordinates for a set of points within the three-dimensional point cloud, wherein information describing a three-dimensional co-ordinate is represented as a location within the two-dimensional representation and a value at the location.

14. The method of claim 13, wherein the two-dimensional representation comprises a two-dimensional view of the three-dimensional point cloud, and wherein, for a point within the set of points, the three-dimensional co-ordinate is determined by a reverse projection from the location within the two-dimensional representation, where the value at the location indicates a depth of the point perpendicular to the two-dimensional view.

15. The method of claim 13, wherein obtaining encoded data comprises: obtaining a frame of encoded two-dimensional data, the frame having a plurality of associated custom data planes; and
obtaining encoded data associated with the plurality of associated custom data planes.

16. The method of claim 11, wherein decoding the encoded data for a custom color plane comprises:
obtaining data associated with the plurality of layers for a custom data plane; reconstructing a base layer within the plurality of layers at a first, lower resolution; reconstructing a version of the two-dimensional representation by upsampling the base layer, and
applying a residual layer within the plurality of layers at a second, higher resolution to the reconstructed version of the two-dimensional representation to generate a version of the two-dimensional representation at the second, higher resolution.

17. The method of claim 13, comprising:
obtaining an indication of a region of interest associated with the three-dimensional point cloud;
decoding a subset of the encoded data to extract a two-dimensional representation associated with the region of interest,
wherein the set of points comprise points within the region of interest.

18. The method of claim 17, wherein decoding a subset of the encoded data comprises: obtaining encoded data associated with the plurality of layers for a custom data plane;
decoding at least a portion of a base layer that is associated with the region of interest, the base layer being within the plurality of layers at a first, lower resolution;
decoding a portion of a residual layer within the plurality of layers at a second, higher resolution;
reconstructing a version of the two-dimensional representation by upsampling the portion of the base layer, and
applying the decoded portion of the residual layer to the reconstructed version of the two-dimensional representation to generate a version of the two-dimensional representation at the second, higher resolution.

19. The method of claim 13, comprising:
obtaining an indication of a desired resolution for rendering at least a portion of the three-dimensional point cloud;
determining a subset of the plurality of layers to decode to provide the desired resolution; and
decoding encoded data for the subset of the plurality of layers to reconstruct one or more two-dimensional representations associated with the desired resolution; and processing the one or more two-dimensional representations associated with the desired resolution to determine three-dimensional co-ordinates corresponding to the desired resolution for the set of points within the three-dimensional point cloud.

20. The method of claim 13, wherein the tier-based hierarchical coding format is associated with a tier-based hierarchical video coding scheme and decoding the encoded data comprises:
for a frame of encoded video within the tier-based hierarchical video coding scheme, extracting encoded data for a plurality of custom data planes associated with the frame, the plurality of custom data planes encoding information regarding three-dimensional co-ordinates for points within the three-dimensional point cloud and one or more properties of said points;
applying a decoder for the tier-based hierarchical video coding scheme to the extracted encoded data to reconstruct the plurality of custom data planes at a desired level of detail, wherein the plurality of custom data planes comprise a plurality of two-dimensional representations associated with the three-dimensional point cloud; and
processing the plurality of custom data planes to reconstruct a state of the set of points within the three-dimensional point cloud at a point in time associated with the frame.

* * * * *